United States Patent
Noda

(10) Patent No.: US 7,752,282 B2
(45) Date of Patent: Jul. 6, 2010

(54) ADDRESS INFORMATION MANAGING SYSTEM, MANAGEMENT APPARATUS, PROCESSING APPARATUS AND ADDRESS BOOK UPDATING METHOD

(75) Inventor: Yukihiro Noda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 841 days.

(21) Appl. No.: 11/582,401

(22) Filed: Oct. 18, 2006

(65) Prior Publication Data

US 2007/0260807 A1 Nov. 8, 2007

(30) Foreign Application Priority Data

Mar. 27, 2006 (JP) ............................. 2006-084754

(51) Int. Cl.
G06F 15/16 (2006.01)
(52) U.S. Cl. .................. 709/217; 709/206; 709/219
(58) Field of Classification Search ............... 709/206, 709/217, 203, 219; 707/200
See application file for complete search history.

(56) References Cited

U.S. PATENT DOCUMENTS

| | | | | |
|---|---|---|---|---|
| 6,405,243 | B1* | 6/2002 | Nielsen | 709/206 |
| 7,092,994 | B2* | 8/2006 | Nishio et al. | 709/203 |
| 2002/0143879 | A1* | 10/2002 | Sommerer | 709/203 |
| 2002/0169838 | A1 | 11/2002 | Oyama | 709/206 |
| 2006/0190626 | A1* | 8/2006 | Bhogal et al. | 709/248 |
| 2006/0236089 | A1* | 10/2006 | Cohen | 713/150 |
| 2006/0288077 | A1* | 12/2006 | Chen | 709/206 |
| 2007/0094337 | A1* | 4/2007 | Klassen et al. | 709/206 |
| 2007/0106698 | A1* | 5/2007 | Elliott et al. | 707/200 |

FOREIGN PATENT DOCUMENTS

| | | |
|---|---|---|
| JP | 8-331244 | 12/1996 |
| JP | 2002-183043 | 6/2002 |
| JP | 2005-33733 | 2/2005 |
| KR | 1999-0063509 | 7/1999 |

* cited by examiner

Primary Examiner—Ramy M Osman
(74) Attorney, Agent, or Firm—Fujitsu Patent Center

(57) ABSTRACT

In a communication system in which a plurality of processing apparatuses are communicably connected to one another over a network, a processing apparatuses has an update request issuing unit issuing an update request containing address information to be updated in order to update an address book and an address book updating unit updating the address book on the basis of a response result to the update request, a determining unit determines whether or not the address information contained in the update request is valid when receiving the update request from the processing apparatus, and a response result transmitting unit transmits a result of determination made by the determining unit to the processing apparatus as the response result to the update request. The address book of the processing apparatus retaining the address information about other processing apparatuses can be updated to the latest state, with certainty.

8 Claims, 19 Drawing Sheets

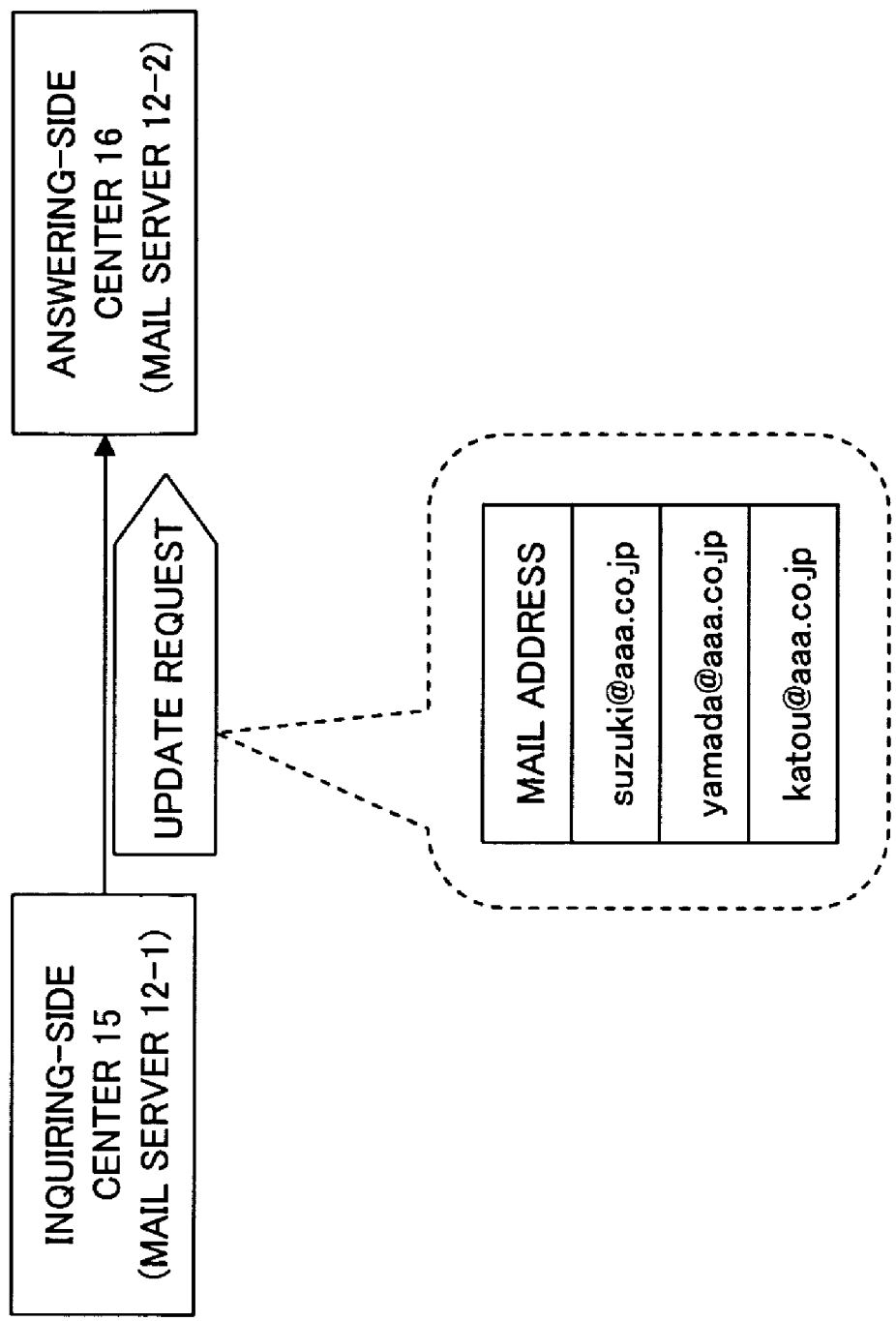

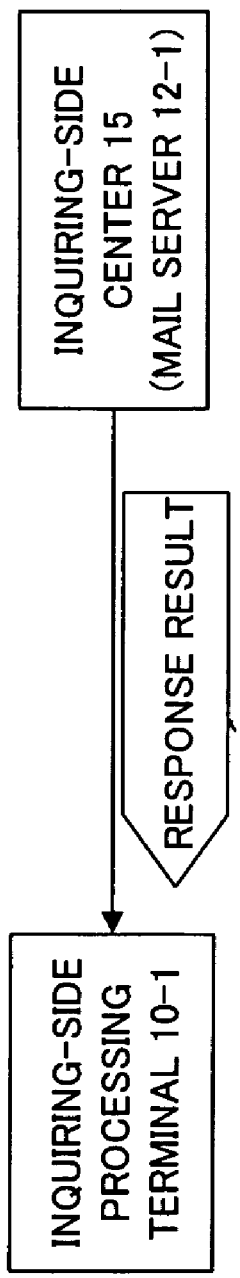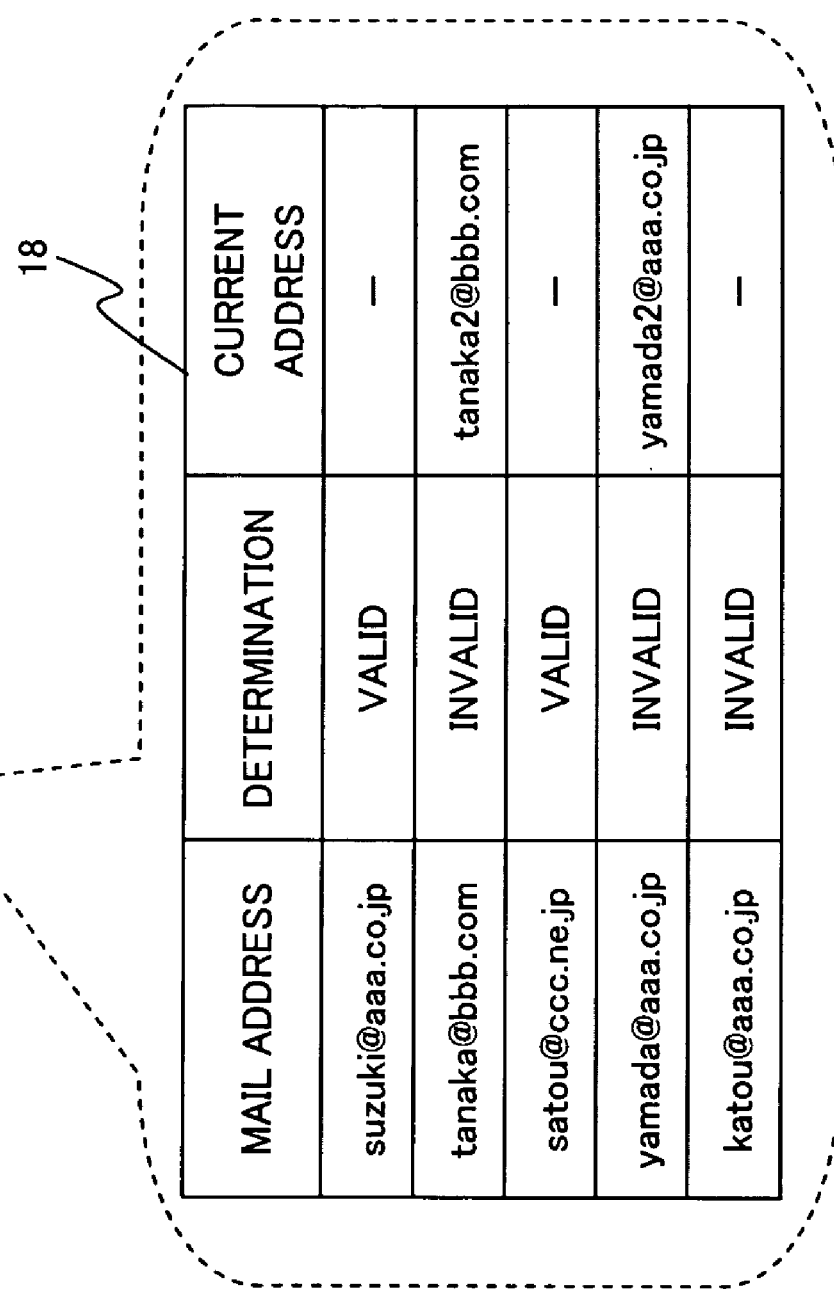
FIG. 15(a)
FIG. 15(b)

FIG. 19

| INQUIRED ADDRESS | DETERMINATION | CURRENT ADDRESS |
|---|---|---|
| suzuki@aaa.co.jp | VALID | — |
| yamada@aaa.co.jp | INVALID | yamada2@aaa.co.jp |
| katou@aaa.co.jp | INVALID | — |

FIG. 20

| FORMER MAIL ADDRESS | CURRENT MAIL ADDRESS | ADDRESS GIVEN DISCLOSURE-PERMISSION |
|---|---|---|
| yamada@aaa.co.jp | yamada2@aaa.co.jp | ikeda@ddd.co.jp, ⋯ |
| ⋯ | ⋯ | |

| FORMER MAIL ADDRESS | CURRENT MAIL ADDRESS | ADDRESS NOT GIVEN DISCLOSURE-PERMISSION |
|---|---|---|
| yamada@aaa.co.jp | yamada2@aaa.co.jp | okada@eee.co.jp, ... |
| ... | ... | |

26c

ADDRESS INFORMATION MANAGING SYSTEM, MANAGEMENT APPARATUS, PROCESSING APPARATUS AND ADDRESS BOOK UPDATING METHOD

BACKGROUND OF THE INVENTION

1) Field of the Invention

The present invention relates to a technique for updating an address book of a processing terminal (a processing apparatus), which retains address information on other processing terminals, to the latest state, in a communication system in which a plurality of processing terminals are communicably connected to one another.

2) Description of the Related Art

Recently spread are processing terminals (hereinafter, referred simply terminals) such as personal computers, PDA (Personal Digital Assistants), cellular phones and so forth, which can transmit/receive information (E-mails, speeches, etc.) to/from one another over a network.

Such processing terminal manages address information (hereinafter, referred to simply as addresses) used to specify other processing terminals in its address book.

In the case where a plurality of processing terminals transmit/receive electronic mails, mail addresses correspond to the address information. In the case where a plurality of processing terminals make speech calls by using IP (Internet Protocol) telephones or transmit/receive character messages by using instant messengers or the like, addresses (for example, IP addresses) for specifying relevant processing terminals correspond to the address information.

It is preferable that the state of the address book is updated when the user of other processing terminal changes his/her address, so that the address book is kept in the latest state.

Heretofore, update of the address book is executed by that the user makes transmission to each address retained in the address book to confirm whether to receive an appropriate response to the transmission.

Namely, the user confirms whether or not addresses retained in the address book are valid in the following manner. The user makes transmission to a certain address, determines that the address is valid when the processing terminal at the address appropriately responds (whether or not a communication with the processing terminal is established), and holds the address as it is in the address book. When the processing terminal at the address does not appropriately respond (when the communication with the processing terminal fails to be established), the user determines that the address is invalid, and makes the address in the address book invalid.

However, this manner is troublesome and time-wasting for the user to update the address book when the number of addresses retained in the address book is large.

To overcome this drawback, there has been proposed a technique (for example, refer to Patent Document 1 below) which, when a mail address of a certain terminal is updated, updates the mail address of the terminal in address books in other terminals, taking this opportunity.

According to the technique disclosed in Patent Document 1, when one terminal updates its mail address, contents of address books of other terminals are automatically updated. For this, other terminals have to have a function of accepting (permitting) an instruction for updating the mail address in its address book given from the outside, and a function of updating its address book according to the instruction.

It is not efficient to provide such the functions to all terminals in a network system in which an enormous number of terminals are communicably connected to transmit/receive mails through a plurality of mail servers.

According to the technique disclosed in Patent Document 1, other terminals to which the changed mail address of a certain terminal is to be notified are designated on the basis of an address book retained by the terminal whose mail address has been changed. For this, even if there is a terminal to which the user does not want to notify of his/her changed mail address, the new mail address is unintentionally notified to the terminal so long as an address of the terminal is retained in the user's address book. Thus, the technique disclosed in Patent Document 1 has low versatility.

If a certain terminal can choose another terminal to which the new address is to be notified, the invalid old address remains unchanged and retained in an address book of the latter terminal that has not received the notification (that is, the terminal to which the former terminal has not notified of the address change), so that the address book of the latter terminal remains un-updated.

[Patent Document 1] Japanese Patent Application Laid-Open No. 2005-033733

SUMMARY OF THE INVENTION

In the light of the above drawbacks, an object of the present invention is to provide a technique that can update an address book of a processing terminal (a processing apparatus) retaining address information on other processing terminals to the latest state with certainty, in a communication system in which a plurality of processing terminals are communicably connected to one another.

To attain the above object, the present invention provides an address information managing system comprising a processing apparatus comprising an update request issuing unit issuing an update request containing address information to be updated in order to update an address book of the processing apparatus retaining the address information on other processing apparatuses, and an updating unit updating the address book on the basis of a response result to the update request issued from the update request issuing unit, a determining unit determining whether the address information contained in the update request is valid when receiving the update request issued from the update request issuing unit of the processing apparatus, and a response result transmitting unit transmitting a result of determination made by the determining unit to the processing apparatus as the response result to the update request.

It is preferable that the address information managing system further comprises a valid address list showing valid address information, and the determining unit searches for the address information contained in the update request in the valid address list, determines that the address information is valid when the address information is found in the valid address list, while determining that the address information is invalid when the address information is not found in the valid address list.

It is preferable that the address information managing system further comprises a change history table showing a relationship between current address information retained in the valid address list and former address information that had been used until the address information was changed to the current address information, and a current address information obtaining unit searching for the address information contained in the update request in the change history table when the determining unit determines on the basis of the valid address list that the address information is invalid, and obtaining current address information retained in the valid address list corresponding to the address information contained in the update request from the change history table when the address information is found in the search, and the response result transmitting unit transmits the current address information to the processing apparatus as the response result when the current address information obtaining unit obtains the current address information.

The present invention further provides a management apparatus in a communication network in which a plurality of processing apparatuses are communicably connected to one another over a network, and one of the plural processing apparatuses, which is acting as an inquiring-side processing apparatus, comprises (i) an update request issuing unit issuing an update request containing address information to be updated in order to update an address book thereof retaining address information on other processing apparatuses, and (ii) an updating unit updating the address book on the basis of a response result to the update request issued from the update request issuing unit, the management apparatus managing address information on the other processing apparatuses comprising a determining unit, when receiving the update request issued from the update request issuing unit of the inquiring-side processing apparatus, determining whether the address information contained in the update request is valid, and a response result transmitting unit transmitting a result of determination made by the determining unit to the inquiring-side processing apparatus as the response result to the update request.

The present invention still further provides an address book updating method in a communication system comprising a plurality of processing apparatuses communicably connected to one another, and management apparatuses managing address information on the processing apparatuses, the address book updating method for updating an address book of one of the plural processing apparatuses, which is acting as an inquiring-side processing apparatus, containing address information on other processing apparatuses comprising the steps of issuing an update request containing address information to be updated from the inquiring-side processing apparatus in order to update the address book retaining address information on the other processing apparatuses, determining whether the address information contained in the update request is valid when a relevant one (hereinafter, referred to as an answering-side management apparatus) of the management apparatuses managing the address information receives the issued update request, transmitting a result of the determination, as a response result to the update request, from the answering-side management apparatus to the inquiring-side processing apparatus, and updating the address book on the basis of the response result when the inquiring-side processing apparatus receives the transmitted response result.

According to this invention, the update request issuing unit of a processing apparatus transmits an address book update request, the determining unit determines whether or not address information contained in the update request is valid, the response result transmitting unit transmits a result of the determination as a response result to the processing apparatus, and the updating unit of the processing apparatus having received the response result updates the address book on the basis of the response result. Thus, the processing apparatus can update the address book to the latest state with certainty.

The determining unit determines whether or not the address information contained in the update request is valid on the basis of the valid address list, which permits certain and accurate determination.

When the address information contained in the update request is invalid, the current address information obtaining unit obtains current address information from the change history table, and the response result transmitting unit transmits the current address information obtained by the current address information obtaining unit as the response result to the processing apparatus. Thus, the processing apparatus can update the invalid address information in the address book to the valid current address information.

BRIEF DESCRIPTION OF THE DRAWINGS

FIG. 9(a) is a diagram for illustrating an example of transmission of the update request from the inquiring-side center to an answering-side center in the communication system according to the embodiment of the present invention;

FIG. 9(b) is a diagram showing mail addresses contained in the update request in FIG. 9(a);

FIG. 15(a) is a diagram showing an example of transmission of the response result from the inquiring-side center to the processing terminal in the communication system according to the embodiment of the present invention;

FIG. 15(b) is a diagram for illustrating data as being the response result in FIG. 15(a);

FIG. 19 is a diagram showing a response result address book recorded in a storing unit of the answering-side management center of the communication system according to the embodiment of the present invention;

FIG. 20 is a diagram showing a change history table of the answering-side management server of the communication system according to a modification of the present invention; and FIG. 21 is a diagram showing another change history table of the answering-side management server of the communication system according to the modification of the present invention.

DESCRIPTION OF THE PREFERRED EMBODIMENTS

Hereinafter, description will be made of an embodiment of the present invention with reference to the drawings.

1 Embodiment of the Invention

First, description will be made of a structure of a communication system (address information managing system) 1 according to an embodiment of this invention with reference to a block diagram shown in FIG. 1.

Figure 1:
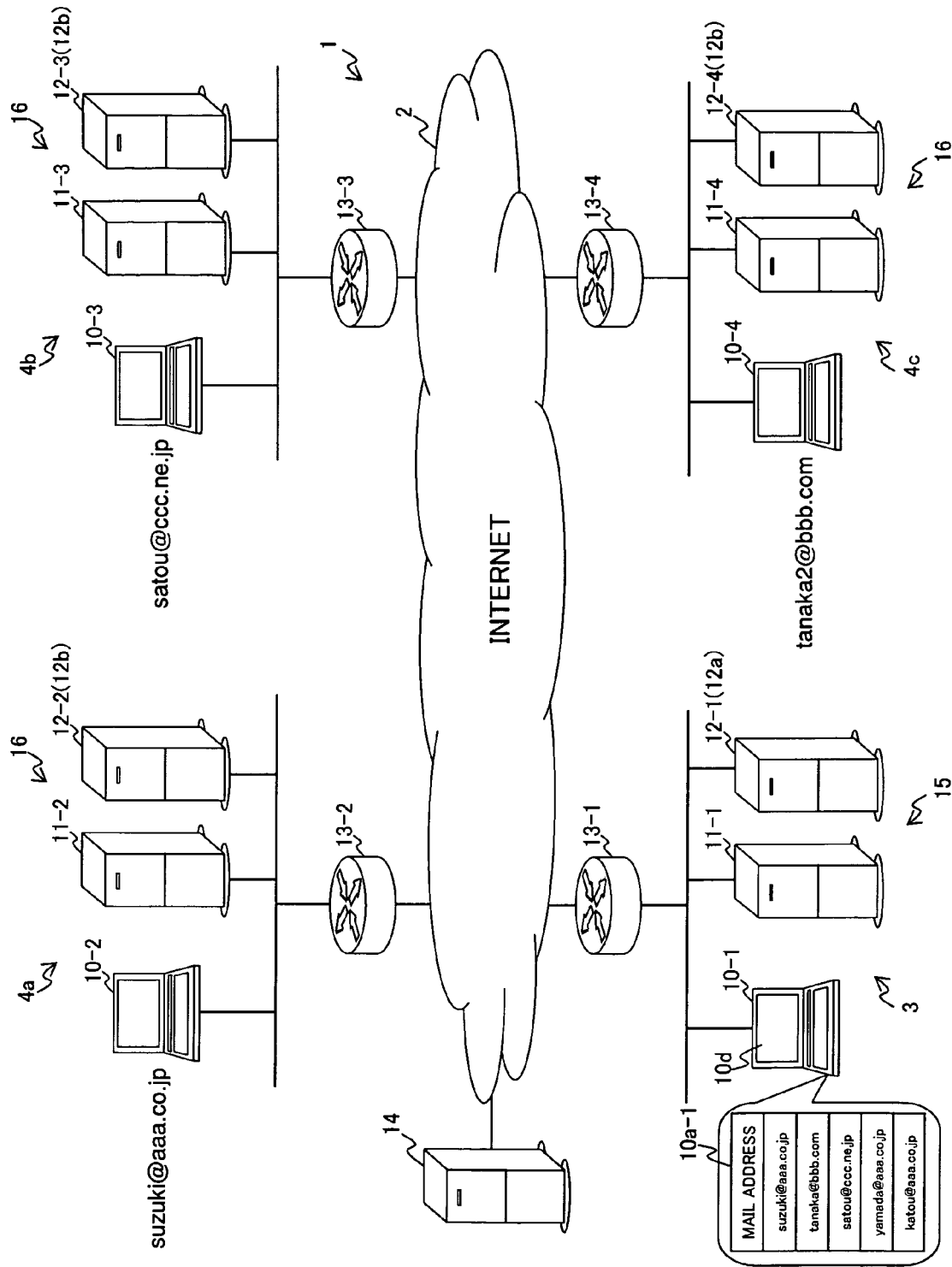
FIG. 1 is a diagram showing a structure of a communication system according to an embodiment of the present invention.
Figure 2:
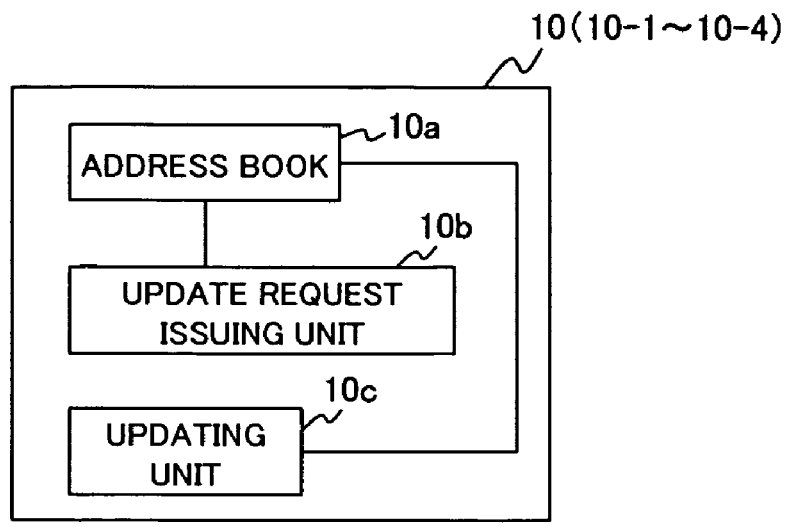
FIG. 2 is a block diagram showing a structure of a processing terminal of the communication system according to the embodiment of the present invention.

As shown in FIG. 1, the communication system 1 comprises a communication network (here, the Internet) 2, a plurality of processing terminals (processing apparatuses) 10-1 to 10-4, DNS (Domain Name System) servers 11-1 to 11-4, mail servers (management servers; management apparatuses) 12-1 to 12-4, routers 13-1 to 13-4 and a reliability check server 14.

Here, the plural processing terminal 10-1 to 10-4 are personal computers (PC), having at least a function of transmitting/receiving electronic mails to/from another processing terminal. Each of the processing terminals 10-1 to 10-4 is provided with an address book (for example, refer to an address book 10a-1 of the processing terminal 10-1) for retaining mail addresses (address information) of other processing terminals.

In the communication system 1, each of the plural processing terminals 10-1 to 10-4 is connected to the Internet 2 through a corresponding DNS server 11-1, 11-2, 11-3 or 11-4 for converting mail addresses and a corresponding mail server 12-1, 12-2, 12-3, or 12-4 for managing transmission/reception of electronic mails. The plural processing terminals 10-1 to 10-4 are communicably connected to one another to transmit/receive electronic mails.

In other words, the processing terminal 10-1 is connected to the Internet 2 through the DNS server 11-1 and the mail server 12-1, the processing terminal 10-2 to the Internet 2 through the DNS server 11-2 and the mail server 12-2, the processing terminal 10-3 to the Internet 2 through the DNS server 11-3 and the mail server 12-3, and the processing terminal 10-4 to the Internet 2 through the DNS server 11-4 and the mail server 12-4, whereby the plural processing terminals 10-1 to 10-4 are connected to one another to be able to transmit/receive electronic mails.

The plural processing terminals 10-1 to 10-4 (hereinafter, referred to simply as a processing terminal 10 when the plural processing terminal 10-1 to 10-4 are not specifically discriminated from one another), the mail servers 11-1 to 11-4 (hereinafter, referred to simply as a mail server 11 when the plural mail servers 11-1 to 11-4 are not specifically discriminated from one another), and the DNS servers 12-1 to 12-4 (hereinafter, referred to simply as a DNS server 12 when the plural DNS servers 12-1 to 12-4 are not specifically discriminated from one another) are connected through routers 13-1 to 13-4 functioning as "Fire Wall," or "Gate Way," respectively.

In the communication system 1, as shown in FIG. 1, the processing terminal 10-1, the DNS server 11-1, the mail server 12-1 and the router 13-2 are designated as an inquiring-side mail system 3. On the other hand, the processing terminal 10-2, the DNS server 11-2, the mail server 12-2 and the router 13-2 are designated as an answering-side mail system 4a, the processing terminal 10-3, the DNS server 11-3, the mail server 12-3 and the router 13-3 are designated as an answering-side mail system 4b, and the processing terminal 10-4, the DNS server 11-4, the mail server 12-4 and the router 13-4 are designated as an answering-side mail system 4c.

As shown in FIG. 1, a mail address of the processing terminal 10-2 is "suzuki@aaa.co.jp," a mail address of the processing terminal 10-3 is "satou@ccc.ne.jp," and a mail address of the processing terminal 10-4 is "tanaka2@bbb.com," as shown in FIG. 1.

Each of the plural processing terminals 10 comprises an address book 10a, an update request issuing unit 10b, and an updating unit 10c.

The address book 10a retains mail addresses of the other processing terminals 10 than this processing terminal 10.

The update request issuing unit 10b issues an update request containing mail addresses to be updated retained in the address book 10a, in order to update the address book 10a to the latest state.

The update request issuing unit 10b periodically issues the update request to the mail server 11 managing transmission/reception of electronic mails of its processing terminal 10.

The updating unit 10c updates the address book 10a on the basis of a result of response to the update request issued from the update request issuing unit 10b, fed from the mail server 11 managing transmission/reception of electronic mails transmitted from the other processing terminals.

Concretely, when receiving a response result that the mail address to be updated contained in the update request is valid, the updating unit 10c admits that the mail address in the address book 10a is valid, and retains the mail address as it is. On the other hand, when receiving a response result that the mail address to be updated is invalid, the updating unit 10c deletes it from the address book 10a.

When receiving a changed mail address (current mail address) of the mail address (former mail address) to be updated as a response result, the updating unit 10c overwrites a changed new mail address (current mail address) on the mail address to be updated (former mail address that had been used until the mail address was changed to the current mail address) in the address book 10a, thereby updating the address book 10a.

The DNS server 11 converts a mail address into an IP address. In the communication system 1, IP addresses converted by the DNS servers 11 enable communications by the plural processing terminals 10 over the Internet 2.

The mail server 12 manages communications (here, transmission and reception of electronic mails) by a corresponding processing terminal 10, managing a mail address of the processing terminal 10. Here, the mail address of the processing terminal 10-1 is managed by the mail server 12-1, a mail address of the processing terminal 10-2 by the mail server 12-2, a mail address of the processing terminal 10-3 by the mail server 12-3, and a mail address of the processing terminal 10-4 by the mail server 12-4.

Figure 3:
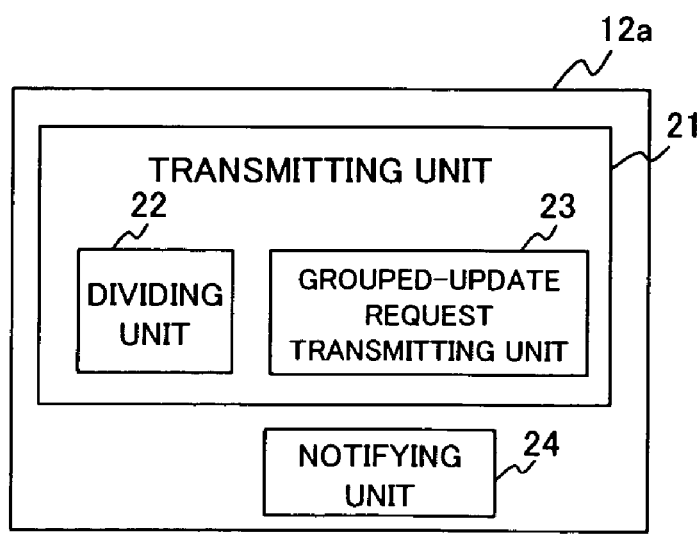
FIG. 3 is a block diagram showing a structure of an inquiring-side management server of the communication system according to the embodiment of the present invention.

When the processing terminal 10 managed by the mail server 12 issues an update request to update its address book 10a, the mail server 12 functions as the inquiring-side management server 12a (refer to FIG. 3 to be described later). On the other hand, when receiving an update request from another processing terminal not managed by this mail server 12, the mail server 12 functions as an answering-side management server 12b (refer to FIG. 4 to be described later)

In this communication system 1, a DNS server 11 and a mail server 12 (in the example shown in FIG. 1, the DNS server 11-1 and the mail server 12-1) managing a processing terminal issuing the update request function as the inquiring-side center 15, while a DNS server 11 and a mail server 12 (in the example shown in FIG. 1, the DNS server 11-2 and the mail server 12-2, the DNS server 11-3 and the mail server 12-3, and the DNS server 11-4 and the mail server 12-4) receiving the update request issued from another processing terminal 10 function as the answering-side center 16.

Now, a case where the mail server 12 functions as the inquiring-side management server 12a will be described. FIG. 3 is a block diagram showing in principle a functional constitution of the mail server 12 in the case where the mail server 12 functions as the inquiring-side management server 12a. As shown in FIG. 3, the mail server 12 functions as a transmitting unit 21 and a notifying unit 24 when functioning as the inquiring-side management server 12a. Incidentally, the more concrete structure of the mail server 12 will be described later with reference to FIG. 16.

When receiving an update request from the update request issuing unit 10b of the processing terminal 10 managing transmission and reception of electronic mails, the transmitting unit 21 transmits the update request to an answering-side management server managing a mail address to be updated on the basis of this mail address contained in the update request. The transmitting unit 21 comprises a dividing unit 22 and a grouped-updated request transmitting unit 23.

When a plurality of mail addresses are contained in the update request from the processing terminal 10, the dividing unit 22 divides the plural mail addresses into groups for respective mail servers 12 managing these mail addresses.

In the communication system 1, there are four mail servers 12-1 to 12-4, and these mail servers 12-1 to 12-4 manage mail addresses of domain names different from one another. Concretely, the mail server 12-2 managing a mail address of the processing terminal 10-2 manages mail addresses of a domain name "aaa.co.jp," the mail server 12-3 managing a mail address of the processing terminal 10-3 manages mail addresses of a domain name "ccc.ne.jp," the mail server 12-3 managing a mail address of the processing terminal 10-4 manages mail addresses of a domain name "bbb.com."

The dividing unit 22 divides a plurality of mail addresses contained in the received update request into groups according to the domain names, thereby dividing the mail addresses into groups for respective mail servers 12.

The grouped-updated request transmitting unit 23 transmits each of the groups divided by the dividing unit 22 to a corresponding mail server 12.

When the notifying unit 24 receives a result of response to the update request fed from the transmitting unit 21 sent back from the answering-side management server 12b [more concretely, a response result transmitting unit 29 (refer to FIG. 4 to be described later)], the notifying unit 24 notifies the processing apparatus 10 of this response result. When receiving a plurality of response results from a plurality of answering-side management servers 12b, the notifying unit 24 collects these plural response results into one, and notifies the processing terminal 10 of it.

Figure 4:
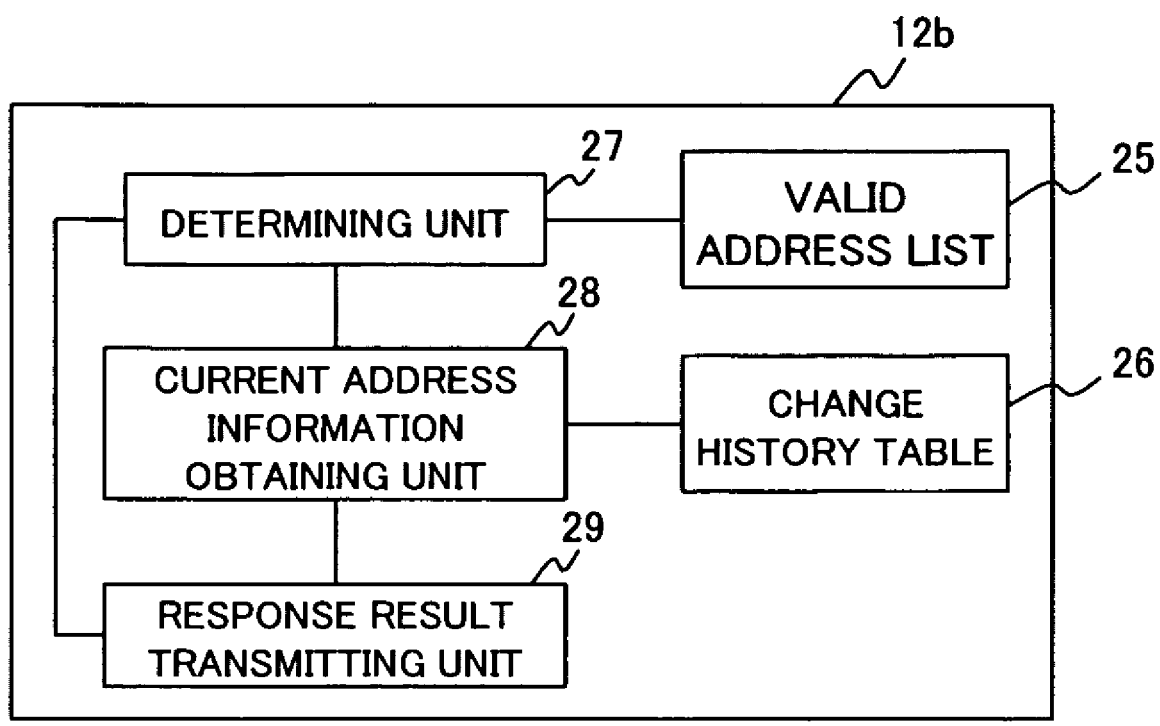
FIG. 4 is a block diagram showing a structure of an answering-side management server of the communication system according to the embodiment of the present invention.

Next, description will be made of a case where the mail server 12 functions as the answering-side management server 12b. FIG. 4 is a block diagram showing in principle a functional constitution of the mail server 12 when the mail server 12 functions as the answering-side management server 12b. As shown in FIG. 4, the mail server 12 functions as a determining unit 27, a current address information obtaining unit 28 and the response result transmitting unit 29 when functioning as the answering-side management server 12b. Additionally, the mail server 12 has a valid address list 25 and a change history table 26. Incidentally, the more concrete structure of the mail server 12 will be described later in detail with reference to FIG. 16.

The valid address list 25 is a list showing valid addresses (current address) of processing terminals 10 whose transmission and reception of electronic mails are managed by this answering-side management server 12b.

Figure 5:
FIG. 5 is a diagram showing an example of a valid address list of the answering-side management server of the communication system according to the embodiment of the present invention.

As shown in FIG. 5, the mail server 12-2 managing the mail address of the processing terminal 10-2 has a valid address list 25a, in which mail addresses of the same domain name (here, "aaa.co.jp") are retained, for example.

The change history table 26 shows a relationship between a mail address retained in the valid address list 25 and a former mail address thereof, which had been used until the mail address was changed to this mail address.

A pair of a former mail address retained in the change history table 26 and a changed mail address (hereinafter, referred to as a current mail address) retained in the valid address list 25 is registered through an operation by the user at the time that the user of the processing terminal 10 changes his/her mail address only when the user permits to notify another person (namely, a user of another processing terminal 10 issuing the update request) of the current mail address. Accordingly, when the user does not permit to notify another person of the current mail address, a pair of the current mail address and the former mail address is not registered to the change history table 26.

Figure 6:
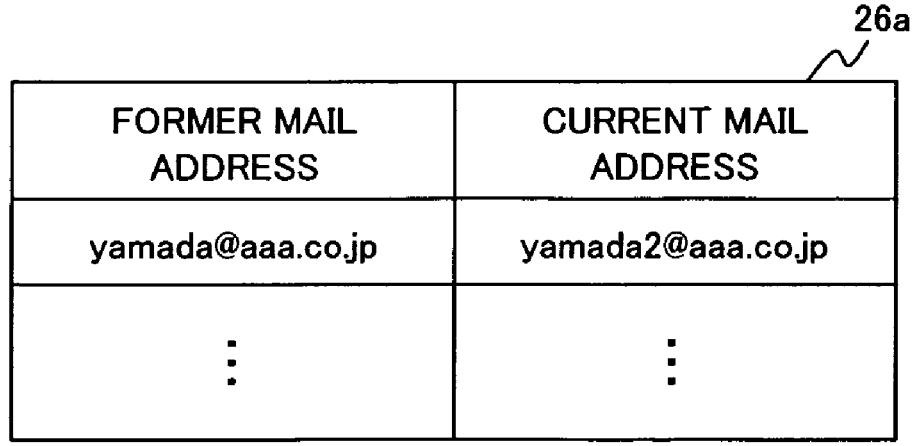
FIG. 6 is a diagram showing an example of a change history table of the answering-side management server of the communication system according to the embodiment of the present invention.

For instance, the mail server 12-2 managing the mail address of the processing terminal 10-2 has a change history table 26a shown in FIG. 6. In the change history table 26a shown in FIG. 6, retained is a current mail address "yamada2@aaa.co.jp" retained in the valid address list 25a corresponding to a former address "yamada@aaa.co.jp." Incidentally, the change history table 26a is in a case where the former mail address and the current mail address are of the same domain name. However, this invention is not limited to this example, but the former and current mail addresses having different domain names (that is, mail addresses whose mail servers 12 are different) may be registered to the change history table 26*a*.

The determining unit 27 determines whether or not a mail address contained in an update request is valid when receiving the update request issued from the update request issuing unit 10*b* of another processing terminal 10.

Concretely, the determining unit 27 searches for a mail address contained in the update request in the valid address list 25, and determines that the mail address is valid when the mail address is found in the valid address list 25. When the mail address is not found in the valid address list 25, the determining unit 27 determines that the mail address is invalid.

When the determining unit 27 determines on the basis of the valid address list 25 that the mail address contained in the update request is invalid, the current address information obtaining unit 28 searches for the mail address in the change history table 26. When the mail address is found in the change history table 26, the current address information obtaining unit 28 obtains, from the change history table 26, a current mail address corresponding to the mail address contained in the update request (that is, a mail address retained as the fellow of the mail address contained in the update request).

The response result transmitting unit 29 transmits a result of determination made by the determining unit 27, that is, a result of determination on whether or not the mail address contained in the update request is valid, to the processing terminal 10 having issued the update request.

When the current address information obtaining unit 28 obtains a current mail address, the response result transmitting unit 29 transmits the current mail address as a response result to the update request to the processing terminal 10 having issued the update request.

To the reliability check server 14, registered is information about reliable mail servers (here, the mail servers 12-1 to 12-4) connectable to the Internet 2. Before executing a communication of an electronic mail, update request, response result or the like, the reliability check server 14 checks whether or not an inquiring-side or answering-side mail server is reliable.

Now, description will be made of an address book updating method (steps of an operation of the communication system 1) according to the embodiment of this invention with reference to FIG. 7.

Figure 7:
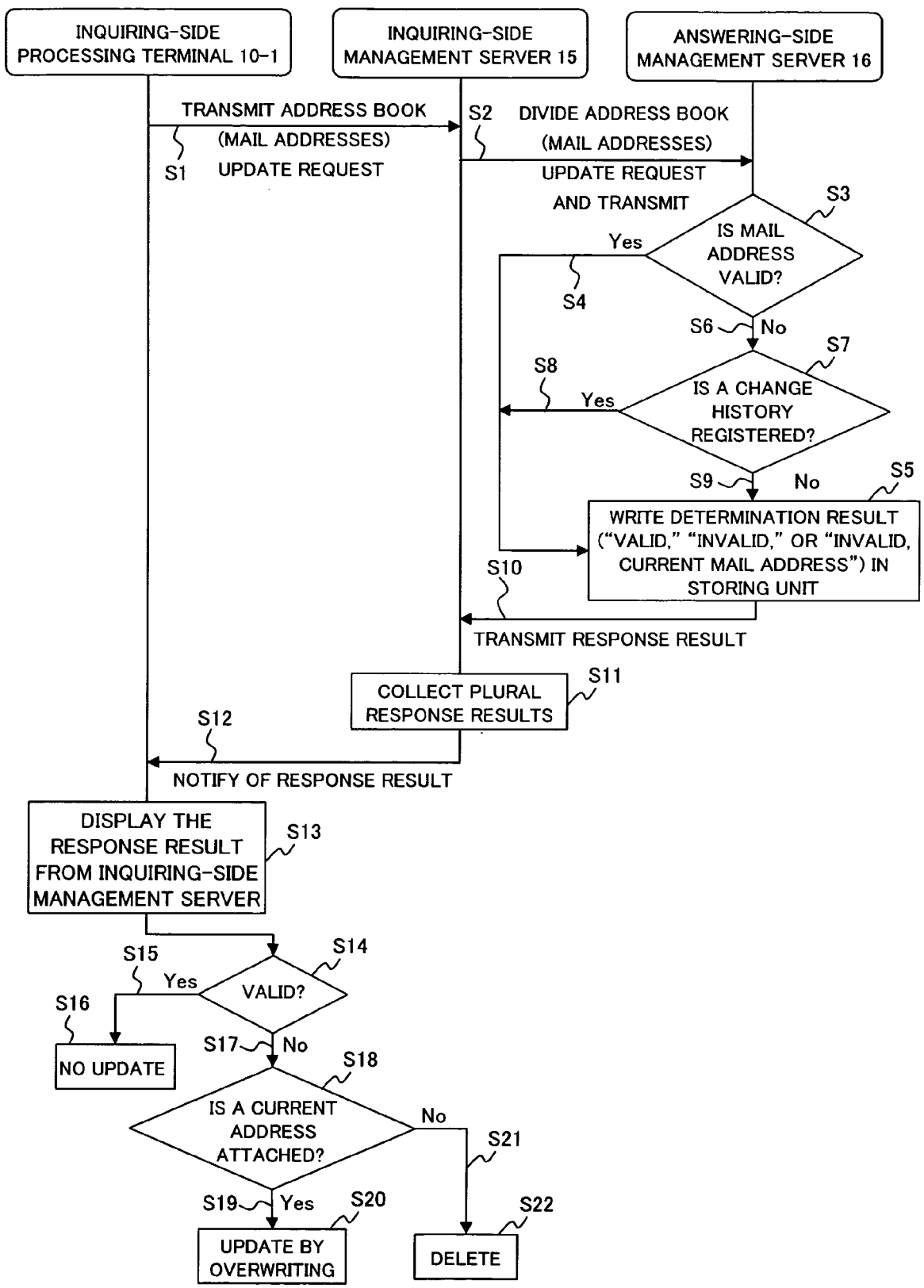
FIG. 7 is a diagram for illustrating steps of an operation in an address book updating method according to the embodiment of the present invention.

Here is described an example, with reference to FIG. 7, where the processing terminal 10-1 issues an update request in order to update the address book 10*a*-1, and mail addresses contained in the update request are mail addresses of the processing terminals 10-2 to 10-4.

In the example shown in FIG. 7, the mail server 12-1 functions as the inquiring-side management server 12*a*, while the mail servers 12-2 to 12-4 function as the answering-side management servers 12*b*.

For this, the inquiring-side center 15 in FIG. 7 is the DNS server 11-1 and the mail server 12-1, while the answering-side center 16 in FIG. 7 includes one consisting of the DNS server 11-2 and the mail server 12-2, one consisting of the DNS server 11-3 and the mail server 12-3, and one consisting of the DNS server 11-4 and the mail server 12-4.

First, the update request issuing unit 10*b* of the inquiring-side processing terminal 10-1 issues an update request (address book update request) to the answering-side center 15 in order to update the address book 10*a* to the latest state (refer to an arrow S1).

Figures 8A, 8B:
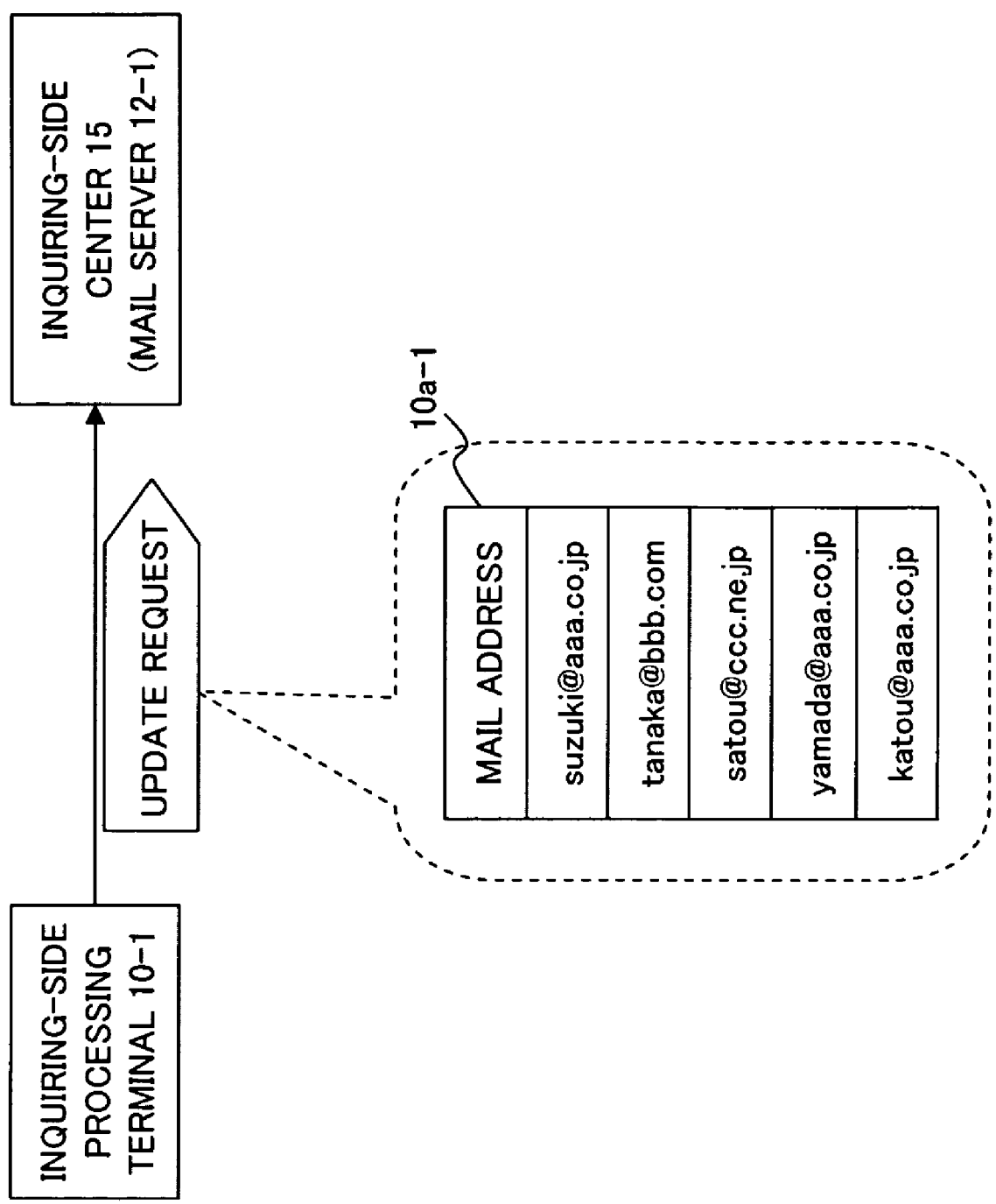
FIG. 8(a) is a diagram for illustrating issue of an update request from the processing terminal to an answering-side center in the communication system according to the embodiment of the present invention.
FIG. 8(b) is a diagram for illustrating mail addresses contained in the update request in FIG. 8(a)

This update request is transmitted from the inquiring-side processing terminal 10-1 to the mail server 12-1 as shown in FIG. 8(*a*). The update request contains all mail addresses retained in the address book 10*a*-1, as shown in FIG. 8(*b*), for example. Incidentally, mail addresses "yamada@aaa.co.jp" and "katou@aaa.co.jp" in the address book 10*a*-1 are mail addresses of processing terminals not shown in FIG. 1.

When the inquiring-side center 15 receives the update request from the inquiring-side processing terminal 10-1, the dividing unit 22 of the transmitting unit 21 of the mail server 12-1 functioning as the inquiring-side management server 12*a* divides all the mail addresses contained in the update request into groups for the mail servers 12 which managing these mail addresses. The grouped-updated request transmitting unit 23 transmits the update requests, each of which contains the divided mail addresses of a corresponding group, to the mail servers 12 managing the mail addresses of the respective groups (refer to an arrow S2).

Here, the update request from the inquiring-side processing terminal 10-1 contains a plurality of mail addresses managed by different mail servers 12, as shown in FIG. 8(*b*). For this, the dividing unit 22 divides these mail addresses into groups for the mail servers 12 managing these mail addresses according to the domain names, and transmits the divided mail addresses in different groups to the respective mail servers 12 each managing the mail addresses in a group of a corresponding domain name, as shown in FIGS. 9(*a*) and 9(*b*) through FIGS. 11(*a*) and 11(*b*).

In other words, the grouped-updated request transmitting unit 23 of the mail server 12-1 transmits an update request containing mail addresses "suzuki@aaa.co.jp," "yamada@aaa.co.jp" and "katou@aaa.co.jp" to the mail server 12-2 acting as the answering-side center 16, as shown in FIGS. 9(*a*) and 9(*b*).

Figures 10A, 10B:
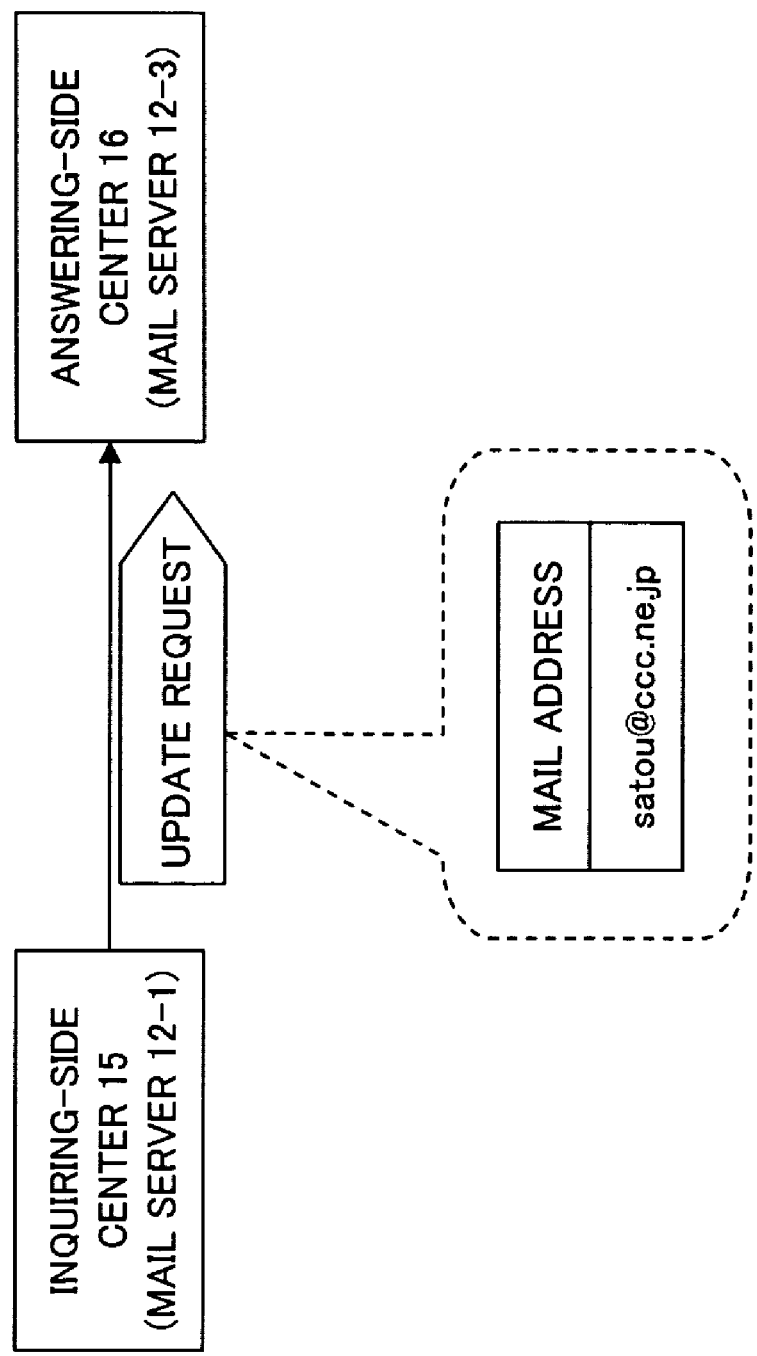
FIG. 10(a) is a diagram showing an example of transmission of the update request from the inquiring-side center to the answering-side center in the communication system according to the embodiment of the present invention.
FIG. 10(b) is a diagram showing a mail address contained in the update request in FIG. 10(a)

As shown in FIGS. 10(*a*) and 10(*b*), the grouped-updated request transmitting unit 23 of the mail server 12-1 transmits an update request containing a mail address "satou@ccc.ne.jp" to the mail server 12-3 acting as the answering-side center 16.

Figures 11A, 11B:
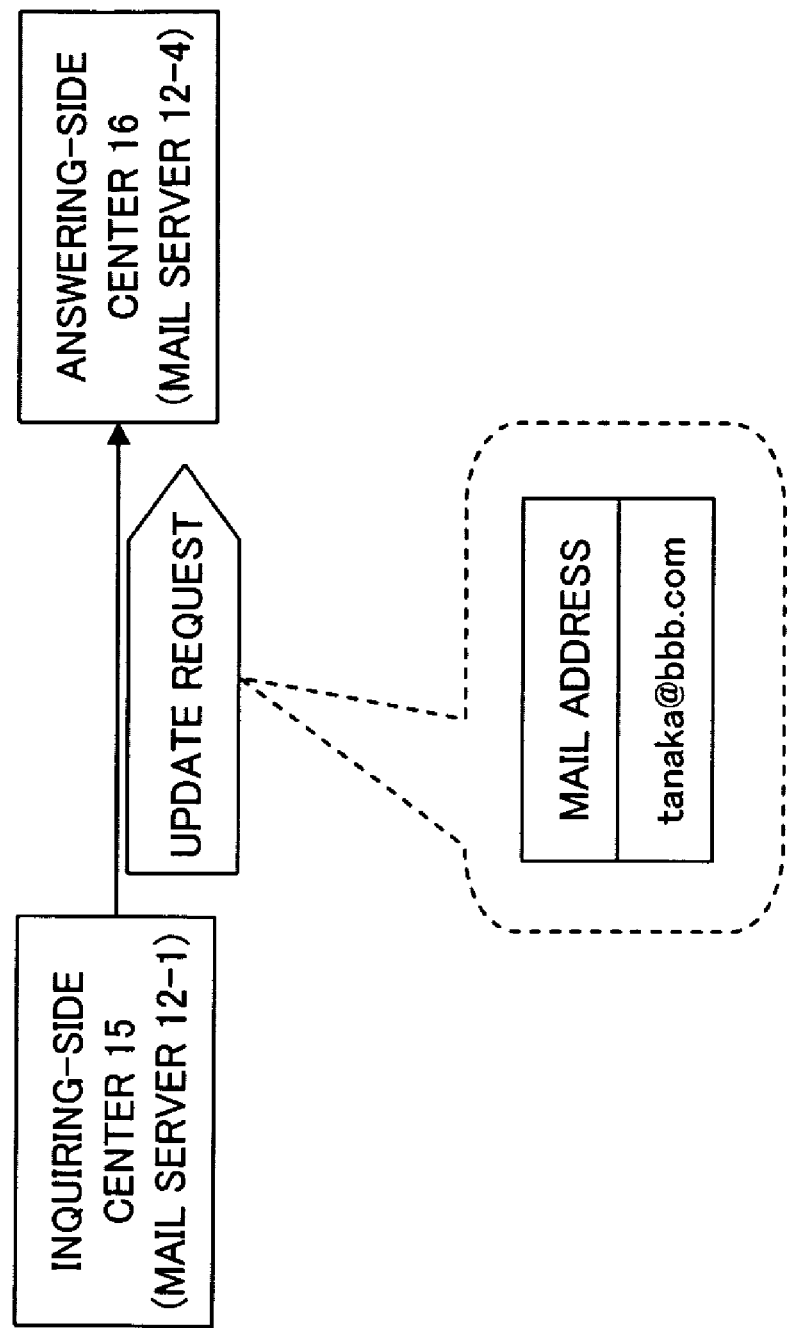
FIG. 11(a) is a diagram showing an example of transmission of the update request from the inquiring-side center to the answering-side center in the communication system according to the embodiment of the present invention.
FIG. 11(b) is a diagram showing a mail address contained in the update request in FIG. 11(a)

As shown in FIGS. 11(*a*) and 11(*b*), the grouped-updated request transmitting unit 23 of the mail server 12-1 transmits an update request containing a mail address "tanaka@bbb.com" to the mail server 12-4 acting as the answering-side center 16.

Meanwhile, the process (process denoted by reference characters S3 to S10) in the answering-side center 16 shown in FIG. 7 to be described later is executed in each of all the mail servers 12-2 to 12-4. Hereinafter, when the process executed in the mail servers 12-2 to 12-4 in common is explained, the mail servers 12-2 to 12-4 are not specifically discriminated from one another, but referred to simply as a mail server 12*b*.

When the answering-side center 16 receives the update request transmitted from the inquiring-side center 15, the determining unit 27 of the answering-side management server 12*b* of the answering-side center 16 determines, on the basis of the valid address list 25, whether or not a mail address contained in the update demand is valid (refer to a reference character "S3").

When it is found as a result of the determination made by the determining unit 27 that the mail address contained in the update request is valid (refer to an arrow S4), the mail server 12*b* relates "valid," which is a result of the determination, to the mail address, and writes them in a storing unit 35*b* (refer to FIGS. 16 and 19 to be described later) (refer to a reference character "S5"). In the mail servers 12-2 and 12-3, the determining unit 27 determines that the mail address is "valid," as well.

On the other hand, when the determining unit 27 determines that the mail address contained in the update request is invalid, as a result (refer to an arrow S6), the current address information obtaining unit 28 of the mail server 12b confirms whether or not a change history of the mail address is registered in the change history table 26 [that is, whether or not that the user of the processing terminal 10-4 permits in prior (at the time of changing the mail address) to disclose a new mail address to another user who transmits an update request to the old mail address is registered as a change history in the change history table 26] (refer to a reference character "S7"). In this case, as shown in FIG. 1, since the mail address of the processing terminal 10-4 has been changed from "tanaka@bbb.com" to "tanaka2@bbb.com," the determining unit 27 of the mail server 12-4 determines that the mail address is "invalid."

When the mail address is found in the change history table 26 as a result of confirmation by the current address information obtaining unit 28 (refer to an arrow S8), the mail server 12b relates "invalid," which is a result of determination made by the determining unit 27 on the mail address, to the mail address, writes them in the storing unit 35b, relates a current mail address of the mail address obtained by the current address information obtaining unit 28 to the mail address, and writes them in the storing unit 35b (refer to a reference character "S5").

When the mail address is not found in the change history table 26 as a result of confirmation made by the current address information obtaining unit 28 (refer to an arrow S9), the mail server 12b relates "invalid" as a result of determination made by the determining unit 27 on the mail address to the mail address, and writes them in the storing unit 35b (refer to a reference character "S5").

The response result transmitting unit 29 of the mail server 12b transmits, to the inquiring-side center 15 (the mail server 12-1), the result written in the storing unit 35b at the process step denoted by the reference character "S5," as a result of response to the update demand (refer to an arrow S10).

When the mail server 12-1 of the inquiring-side center 15 receives response results from the respective response result transmitting units 29 of the mail servers 12b of the answering-side centers 16, the notifying unit 24 of the mail server 12-1 collects the received response results from the mail servers 12b (refer to a reference character "S11"), and notifies the processing terminal 10-1 of the collected response results (refer to an arrow S12).

Figure 12A:
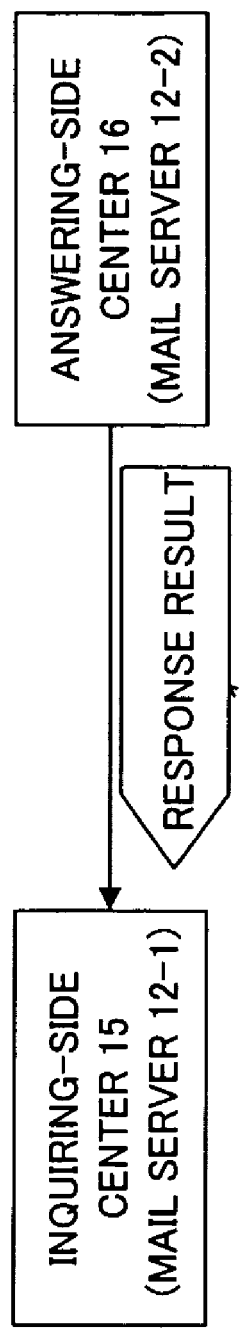
FIG. 12(a) is a diagram showing an example of transmission of a response result from the answering-side center to the inquiring-side center in the communication system according to the embodiment of the present invention.
Figure 12B:
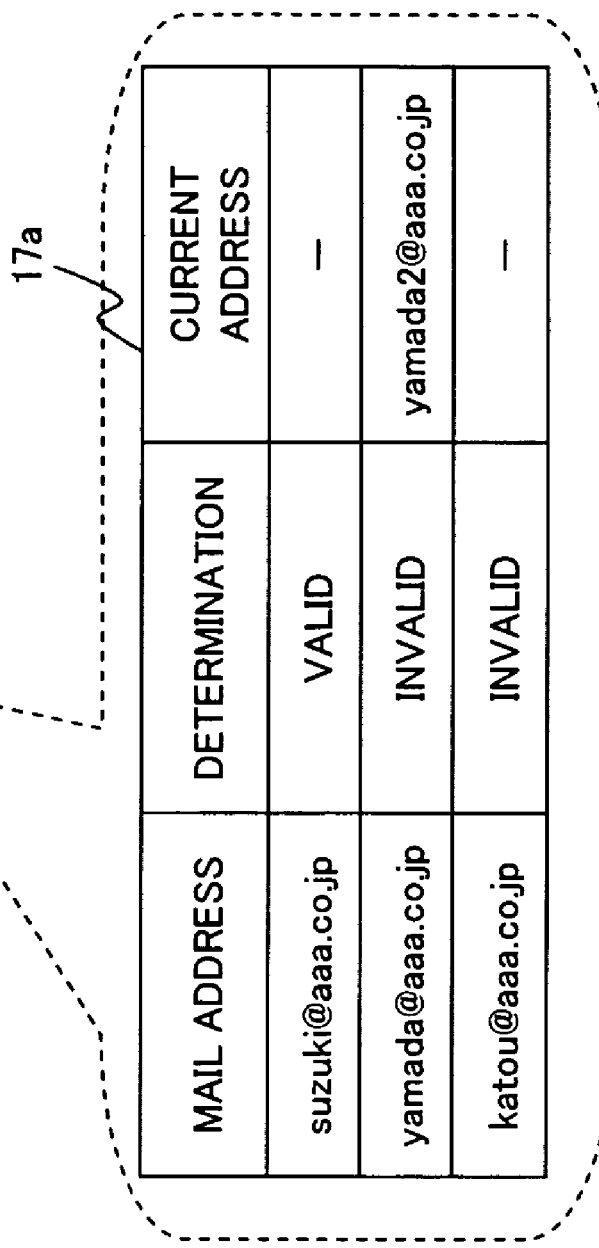
FIG. 12(b) is a diagram for illustrating data as being the response result in FIG. 12(a)
Figure 13A:
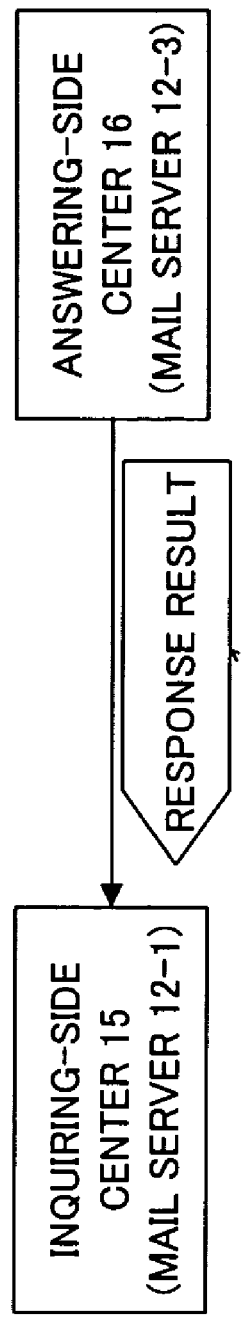
FIG. 13(a) is a diagram showing an example of transmission of the response result from the answering-side center to the inquiring-side center in the communication system according to the embodiment of the present invention.
Figure 13B:
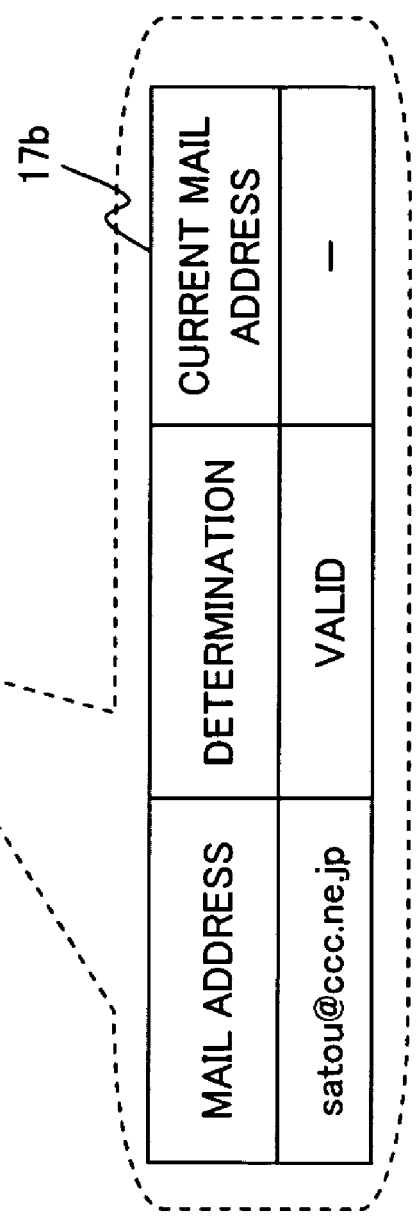
FIG. 13(b) is a diagram for illustrating data as being the response result in FIG. 13(a)
Figure 14A:
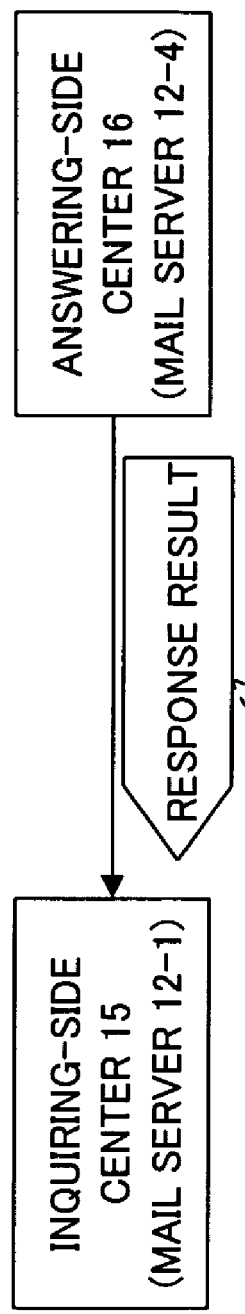
FIG. 14(a) is a diagram showing an example of transmission of the response result from the answering-side center to the inquiring-side center in the communication system according to the embodiment of the present invention.
Figure 14B:
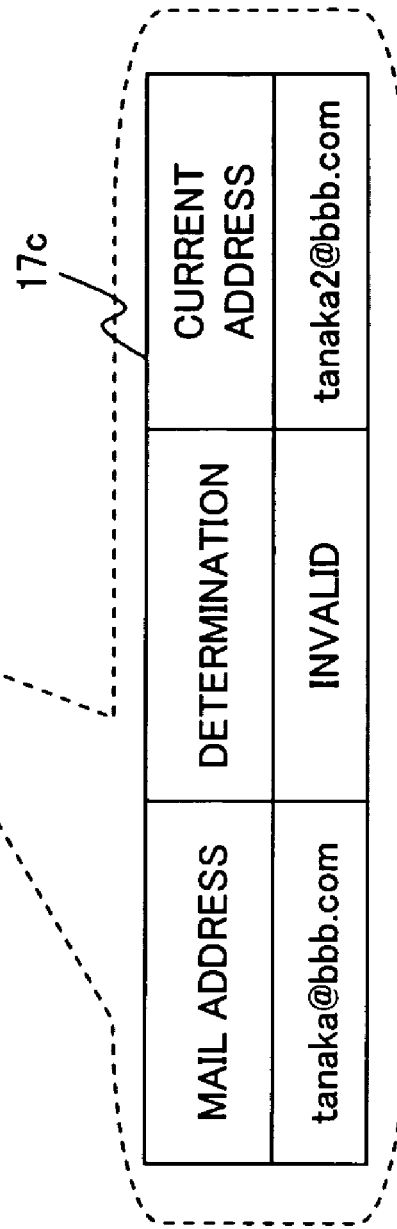
FIG. 14(b) is a diagram for illustrating data as being the response result in FIG. 14(a)

Namely, the mail server 12-1 of the inquiring-side center 15 receives a response result shown in FIGS. 12(a) and 12(b), particularly a response result shown in a table 17a in FIG. 12(b), from the response result transmitting unit 29 of the mail server 12-2, receives a response result shown in FIGS. 13(a) and 13(b), particularly a response result shown in a table 17b in FIG. 13(b), from the response result transmitting unit 29 of the mail server 12-3, and receives a response result shown in FIGS. 14(a) and 14(b), particularly a response result shown in a table 17c in FIG. 14(b), from the response result transmitting unit 29 of the mail server 12-4.

The notifying unit 12-1 of the mail server 12-1 collects, as shown in FIGS. 15(a) and 15(b), these response results shown in FIGS. 12(a), 12(b), 13(a), 13(b), 14(a) and 14(b), and notifies the processing terminal 10-1 of them.

When the processing terminal 10-1 receives the response result [table 18 shown in FIG. 15(b)] from the notifying unit 24 of the mail server 12-1, the processing terminal 10-1 displays the response results on a displaying unit 10d (refer to FIG. 1) (refer to a reference character "S13"), and the updating unit 10c of the processing terminal 10-1 updates the address book 10a according to contents of the response results.

Namely, the updating unit 10c of the processing terminal 10-1 determines whether or not the contents of each of the response results are "valid" (refer to a reference character "S14"). When the response result is "valid" (refer to a reference character S15), the updating unit 10c does not update the address book 10a, but retains the mail address as it is (refer to a reference character "S16").

Since the mail address "suzuki@aaa.co.jp" of the processing terminal 10-2 and the mail address "satou@ccc.ne.jp" of the processing terminal 10-3 are "valid" as shown in a table 18 in FIG. 15(b), the updating unit 10c retains these two addresses in the address book 10a as they are.

When anyone of the response results is "invalid" (refer to an arrow S17), the updating unit 10c confirms whether or not a current mail address is attached to the contents of the response result (refer to a reference character "S18").

When a current mail address is attached to the response result (refer to an arrow S19), the updating unit 10c overwrites the current mail address onto the former mail address in the address book 10a to update the address book 10a (refer to a reference character "S20").

Here, as shown in the table 18 in FIG. 15(b) a current mail address "tanaka2@bbb.com" is attached to a mail address "tanaka@bbb.com" of the processing terminal 10-4, and a current mail address "yamada2@aaa.co.jp" is attached to a mail address "yamada@aaa.co.jp." Thus, the updating unit 10c overwrites "tanaka2@bbb.com" on "tanaka@bbb.com," and "yamada2@aaa.co.jp" on "yamada@aaa.co.jp" to change them.

On the other hand, when no mail address is attached to the mail address (refer to an arrow S21) the updating unit 10c deletes the mail address (invalid mail address) from the address book 10a (refer to a reference character "S22").

Here, as shown in the table 18 in FIG. 15(b) a mail address "katou@aaa.co.jp" is invalid and no current mail address is attached thereto. Thus, the updating unit 10c deletes the mail address "katou@aaa.co.jp" from the address book 10a.

When no current mail address is attached to the response result (refer to an arrow S20), the updating unit 10c may terminate the process, without deleting the mail address from the address book 10a.

According to the communication system 1, the answering-side center 16 examines "validity/invalidity" of a mail address contained in the update request or a current mail address thereof in response to the update request from the processing terminal 10-1, and the processing terminal 10-1 updates the address book 10a according to a result of the examination. Therefore, the processing terminal 10-1 can update the address book 10a with certainty.

Figure 16:
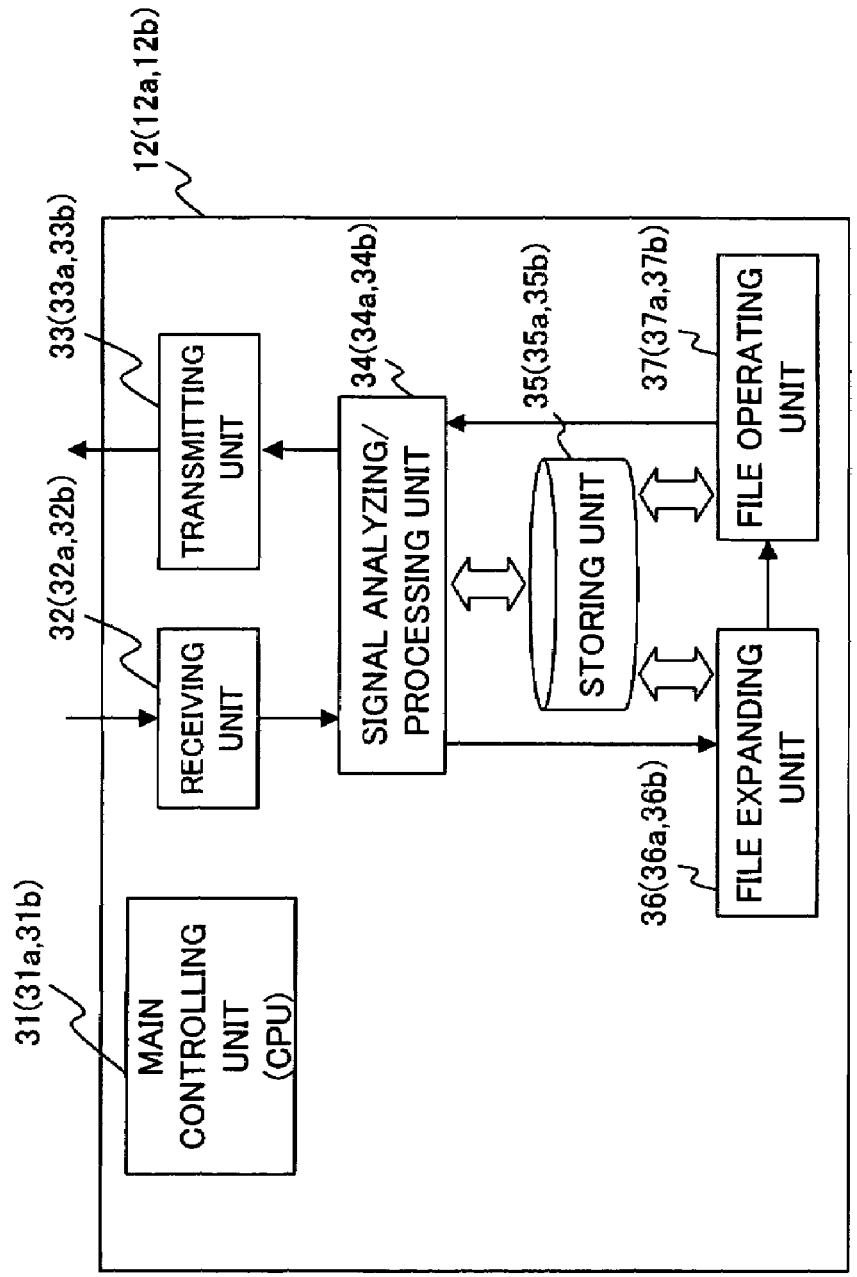
FIG. 16 is a block diagram showing a structure of a mail server (an inquiring-side management server and an answering-side management server) of the communication system according to the embodiment of the present invention.

Next, description will be made of the more concrete structure of the mail server 12 with reference to a block diagram in FIG. 16. As shown in FIG. 16, the mail server 12 comprises a main controlling unit (for example, CPU: Central Processing Unit) 31, a receiving unit 32, a transmitting unit 33, a signal analyzing/processing unit (hereinafter, referred as a signal processing unit) 34, a storing unit 35, a file (address list) expanding unit 36 and a file (address list) operating unit 37.

As described above, the mail server 12 fulfills different functions depending on when acting as the inquiring-side management server 12a or as the answering-side management server 12b. Thus, the above constitutional elements (the main controlling unit 31, the receiving unit 32, the transmitting unit 33, the signal processing unit 34, the storing unit 35, the file expanding unit 36 and the file operating unit 37) fulfill different functions depending on when the mail server 12 acts as the inquiring-side management server 12a or as the answering-side management server 12b.

In the following description, when the mail server 12 acts as the inquiring-side management server 12a, the constitutional elements will be referred to as a main controlling unit 31a, a receiving unit 32a, a transmitting unit 33a, a signal processing unit 34a, a storing unit 35a, a file expanding unit 36a and a file operating unit 37a, respectively. To the contrary, when the mail server 12 acts as the answering-side management server 12b, the constitutional elements are referred to as a main controlling unit 31b, a receiving unit 32b, a transmitting unit 33b, a signal processing unit 34b, a storing unit 35b, a file expanding unit 36b, and a file operating unit 37b, respectively.

Figure 17:
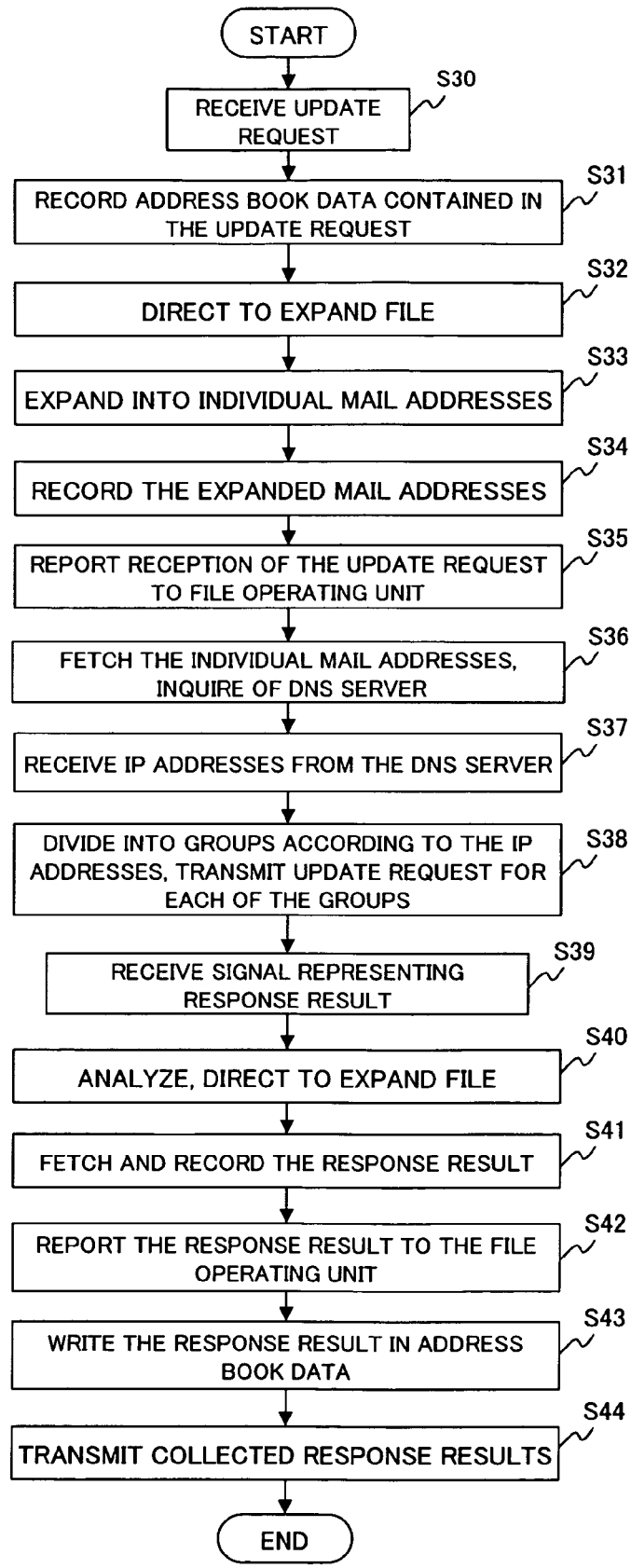
FIG. 17 is a flowchart for illustrating steps of an operation of the inquiring-side management server in the communication system according to the embodiment of the present invention.

As to the constitutional elements in the case where the mail server 12 acts as the inquiring-side management server [for example, an SMPT (Simple Mail Transfer Protocol) server] 12a, steps of an operation of the inquiring-side management server 12a will be described with reference to a flowchart (steps S30 to S44) in FIG. 17. Incidentally, the main controlling unit 31a controls processes by the receiving unit 32a, the transmitting unit 33a, the signal processing unit 34a, the storing unit 35a, the file expanding unit 36a and the file operating unit 37a.

First, the receiving unit 32a receives an update request or an electronic mail transmitted from a corresponding processing terminal 10 (step S30).

Next, the signal processing unit 34a analyzes a signal received by the receiving unit 32a. When the signal received by the receiving unit 32a is an update request, the signal processing unit 34a once stores a list of mail addresses (address book data) to be updated contained in the update request in the storing unit 35a (step S31), and directs the file expanding unit 36a to expand the file (step S32).

When the signal received by the receiving unit 32a is for transmission of an electronic mail, the signal processing unit 34a inquires of the DNS server 11 via the transmitting unit 33a about a mail address of the destination of the electronic mail, and makes the transmitting unit 33a transmit the electronic mail on the basis of an IP address of the electronic mail received via the receiving unit 32a.

When receiving a direction to expand the list of mail addresses contained in the update request retained in the storing unit 35a from the signal processing unit 34a, the file expanding unit 36a expands the address book data into individual mail addresses (step S33), and stores again the expanded individual mail addresses in the storing unit 35a (step S34).

The file expanding unit 36a reports reception of the update request from the processing terminal 10 to the file operating unit 37a (step S35).

The file operating unit 37a fetches each of the individual mail addresses expanded and stored by the file expanding unit 36a from the storing unit 35a, and inquires of the DNS server 11 about an IP address of each of the mail addresses via the signal processing unit 34a and the transmitting unit 33a (step S36).

When the receiving unit 32a receives an IP address of each of the mail addresses from the DNS server 11 (step S37), the signal processing unit 34a analyzes and determines that these IP addresses are for the update request, fetches the address book data stored in the storing unit 35a at the above step S31, divides mail addresses of the address book data into groups for the respective mail servers 12 managing the mail addresses according to the IP addresses, and makes the transmitting unit 33a transmit an update request for each of the groups of the divided mail addresses (step S38).

When the receiving unit 32a receives a signal representing a response result to the update request transmitted at the above step S38 (step S39), the signal processing unit 34a analyzes and determines that the received signal represents a response result, and directs the file expanding unit 36a to expand the file (expand the signal representing a response result) (step S40).

The file expanding unit 36a executes file expansion to fetch the response result (for example, refer to the tables 17a to 17c in FIGS. 12 through 14), and records it in the storing unit 35a (step S41).

The file expanding unit 36a then reports to the file operating unit 36a that the response result has been recorded in the storing unit 35a (step S42).

The file operating unit 37a receives the report from the file expanding unit 36a, fetches the address book data recorded at the above step S31 and the response result recorded at the above step S42, writes the response result in the address book to make a response result in the storing unit 35a where a plurality of response results (for example, the tables 17a to 17c in FIGS. 12 through 14) from the plural mail servers 12 are collected into one (step S43).

Finally, the signal processing unit 34a transmits the response result collected at the above step S42 to the processing terminal 10 through the transmitting unit 33a (step S44), and terminates the process.

As above, the mail server 12 is allowed to act as the inquiring-side management server 12a. At this time, the transmitting unit 33a, the signal processing unit 34a, the storing unit 35a, the file expanding unit 36a and the file operating unit 37a of the mail server 12 functions as the transmitting unit 21, the dividing unit 22 and the grouped-updated request transmitting unit 23 of the above-mentioned inquiring-side management server 12a shown in FIG. 3. At the same time, the transmitting unit 33a, the signal processing unit 34a, the storing unit 35a, the file expanding unit 36a and the file operating unit 37a of the mail server 12 function as the notifying unit 24 of the above-mentioned inquiring-side management server 12a shown in FIG. 3.

Figure 18:
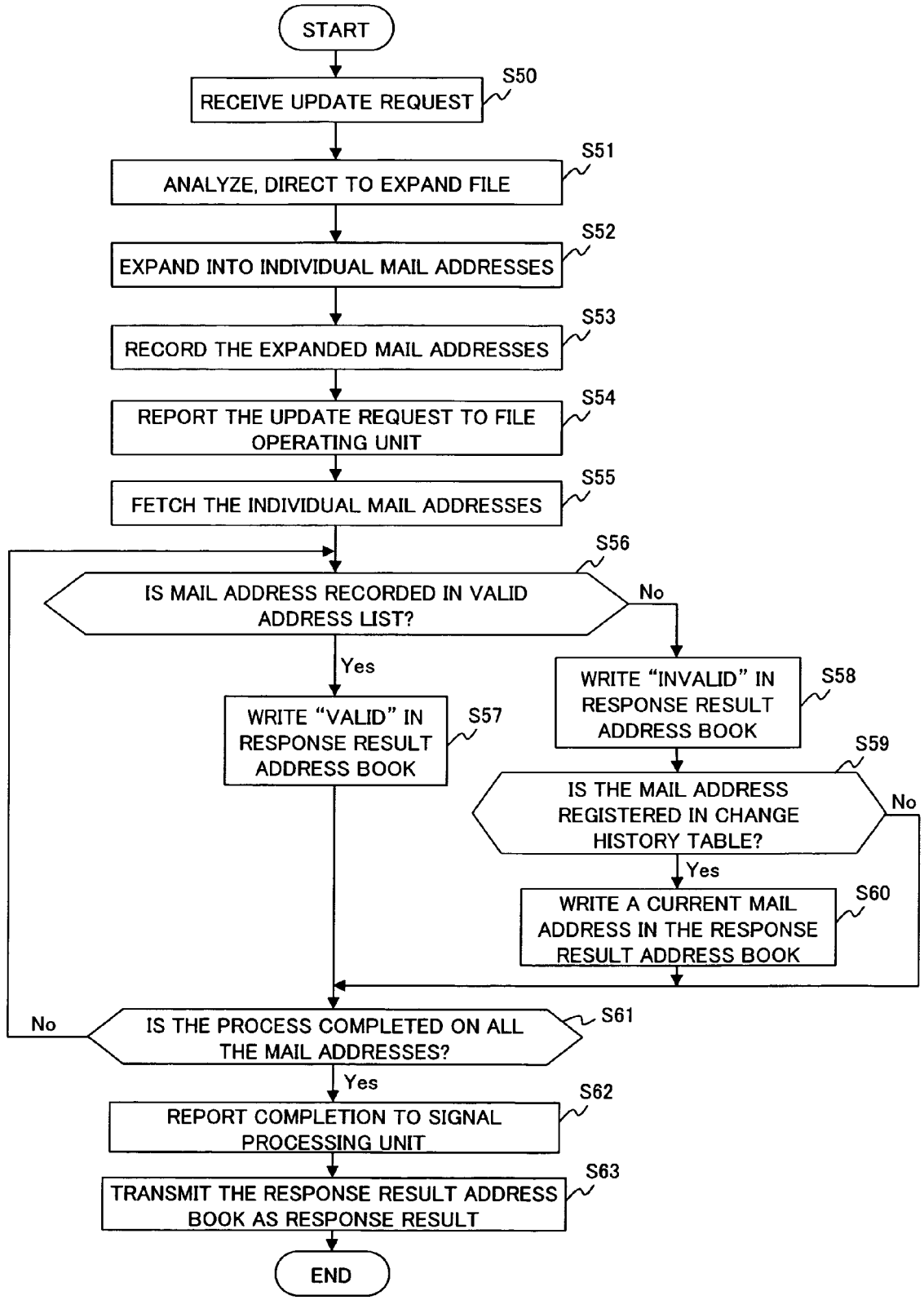
FIG. 18 is a flowchart for illustrating steps of an operation of the answering-side management server in the communication system according to the embodiment of the present invention.

As to the constitutional elements in the case where the mail server 12 acts as the answering-side management server [for example, a POP (Post Office Protocol) 3 server] 12b, steps of an operation of the answering-side management server 12b will be next described with reference to a flowchart (steps S50 to S63) shown in FIG. 18. Incidentally, the main controlling unit 31b controls processes by the receiving unit 32b, the transmitting unit 33b, the signal processing unit 34b, the storing unit 35b, the file expanding unit 36b and the file operating unit 37b.

First, the receiving unit 32b receives an update request from the inquiring-side management server 12a (step S50).

Next, the signal processing unit 34b analyzes a signal representing the update request received by the receiving unit 32b, and determines that the signal received by the receiving unit 32b is an update request. Thereafter, the signal processing unit 34b directs the file expanding unit 36b to execute file expansion (step S51).

The file expanding unit 36b expands a list of mail addresses (address book data) to be updated, contained in the update request into individual mail addresses (step S52), and records the expanded individual mail addresses in the storing unit 35b (step S53).

The file expanding unit 36b then reports reception of the update request from the inquiring-side management server 12a to the file operating unit 37b (step S54).

The file operating unit 37b fetches the individual mail addresses (mail accounts) stored in the storing unit 35b at the above step S53 and a valid address list 25 retained in the answering-side management server 12b (step S55), and compares each of the mail addresses with a mail address retained in the valid address list 25 to determine whether or not each of the individual mail addresses is registered in the valid address list 25 (step S56).

When there is a mail address coinciding with one in the valid address list 25 (Yes route at step S56), the file operating unit 37b writes "valid" as a response result into a place corresponding to the mail address recorded in the storing unit 35b at the above step S53 (step S57). Namely, the file operating unit 37b makes a response result address book 19 shown in FIG. 19, for example, in the storing unit 35b. The response result address book 19 is made when the mail server 12-2 acts as the answering-side management server 12b, corresponding to the table 17a shown in FIG. 12(b).

When there is a mail address not corresponding to any one in the valid address list 25 (No route at step S56), the file operating unit 37b writes "invalid" as a response result into a column corresponding to the mail address recorded in the recording unit 35b at the above step S53, thereby to make the response result address book 19 (step S58).

The file operating unit 37b fetches the change history table 26 retained in the answering-side management server 12b, and determines whether or not the mail address is registered in the change history table 26 (step S59).

When the mail address is found in the change history table 26 (Yes route at step S59), the file operating unit 37b writes a current mail address obtained from the change history table 26 into a column corresponding to the mail address in the response result address book 19, thereby to make the response result address book 19 (step S60).

When the mail address is not found in the change history table 26 (No route at step S59), the file operating unit 37b does not perform the process at the above step S60.

The file operating unit 37b determines whether or not the process is completed on each of all the individual mail addresses fetched at the above step S55 (step S61). When the process is not completed (No route at step S61), the file operating unit 37b executes the processes from the above step S56 to step S60 on mail addresses not yet undergone the process.

When the process is completed on all the mail addresses (that is, when results of the process are all written in the response result address book 19; Yes route at step S61), the file operating unit 37b reports it to the signal processing unit 34b (step S62).

The signal processing unit 34b fetches the response result address book 19 from the storing unit 35b, transmits the data of the response result address book 19 as a response result to the inquiring-side management server 12a through the transmitting unit 33b (step S63), and terminates the process.

As above, the mail server 12 is allowed to act as the answering-side management server 12b. At this time, the transmitting unit 33b, the signal processing unit 34b, the storing unit 35b, the file expanding unit 36b and the file operating unit 37b of the mail server 12 function as the determining unit 27, the current address information obtaining unit 28 and the response result transmitting unit 29 of the above-mentioned inquiring-side management server 12b shown in FIG. 4.

As described above in detail, in the communication system 1 (address book updating method) according to the embodiment of this invention, the update request issuing unit 10b of a processing terminal 10 transmits a request for updating the address book 10a. The determining unit 27 of the answering-side management server 12b determines, on the basis of the valid address list 25, whether or not a mail address contained in the update request is valid, and the response result transmitting unit 29 of the answering-side management server 12b transmits a result of the determination as a response result to the processing terminal 10. The updating unit 10c of the processing terminal 10 having received the response result updates the address book 10a on the basis of the response result. Accordingly, the processing terminal 10 can update the address book 10a to the latest state, with certainty.

The user of the processing terminal 10 can automatically update his/her address book 10a only by issuing an update request, which frees the user from the troublesome work for updating the address book 10a.

Unlike the known technique disclosed in Patent Document 1, the communication system 1 does not require all the processing terminals to have the function of updating the address book. But, to update the address book 10a of a certain processing terminal 10, it is only necessary to provide the update request issuing unit 10b and the updating unit 10c to the processing terminal 10, while providing the determining unit 27 and the response result transmitting unit 29 to a mail server 12 which is the answering-side management server 12b. This makes it easy to realize the function of updating the address book 10a of the processing terminal 10. Accordingly, the communication system 1 can be realized with ease by improving an existing communication system.

Since the determining unit 27 of the answering-side management server 12b determines, on the basis of the valid address list 25, whether or not a mail address contained in an update request is valid, the determination can be made with certainty and accuracy.

The answering-side management server 12b has the current address information obtaining unit 28 which obtains a current mail address from the change history table 26 when the mail address contained in the update request is invalid, and the response result transmitting unit 29 transmits the current mail address obtained by the current address information obtaining unit 28 to a relevant processing terminal 10. When the user having the mail address permits the current mail address to be disclosed to other persons (that is, when the mail address is registered in the changed history table 26), the processing terminal 10 can update the invalid mail address in the address book to the valid current mail address.

Since the update request issuing unit 10b of the processing terminal 10 issues the update request at predetermined time intervals, the address book 10a can be automatically updated with certainty, and the user of the processing terminal 10 can automatically update his/her address book 10a without any operation.

Since the transmitting unit 21 of the inquiring-side management server 12a transmits, on the basis of a mail address to be updated contained in the update request, an update request from the processing terminal 10 to the answering-side management server 12b managing the mail address, the processing terminal 10 can update the address book 10a with certainty only by transmitting the update request to the inquiring-side management server 12a managing communications (mail address) of the processing terminal 10.

The transmitting unit 21 of the inquiring-side management server 12a has the dividing unit 22 which, when plural mail addresses are contained in the update request, divides the mail addresses into groups for the respective answering-side management servers 12b managing the mail addresses, and the grouped-updated request transmitting unit 23 which transmits update requests to the respective answering-side management servers 12b of the groups divided by the dividing unit 22. This allows the processing terminal 10 to collectively update plural mail addresses in the address book 10a. Even when the whole address book 10a is desired to be updated to the latest state, the update request issuing unit 10b is required to issue only one update request, which enables update of the address book 10a with ease and certainty.

The inquiring-side management server 12a has the notifying unit which, when the inquiring-side management server 12a receives plural response results from a plurality of the answering-side management servers 12b, collects the plural response results into one, and notifies the processing terminal 10 of the collected response results. Accordingly, the processing terminal 10 can simultaneously update plural mail addresses in the address book 10a managed by the plural answering-side management servers 12b, with certainty.

2 Others

Note that the present invention is not limited to the above examples, but may be modified in various ways without departing from the spirit and scope of the invention.

In the above embodiment, the plural processing terminals 10 of the communication system 1 are personal computers, which are so connected to one another as to be able to transmit/receive electronic mails over the Internet 2. However, this invention is not limited to this example. As the processing terminals 10 of the communication system of this invention, PDAs, IP telephones, cellular phones and so forth are employable so long as they are communicably connected to one another over a network.

In the above embodiment, all mail addresses retained in the address book 10a are contained in an update request as mail addresses to be updated. However, this invention is not limited to this example. The user of the processing terminal 10 who issues an update request may designate each mail address to be contained in the update request by operating the processing terminal 10 (for example, the mouse or keyboard), whereby the address book 10a can be efficiently updated.

In the above embodiment, the inquiring-side management server 12b has the change history table 26, the current address information obtaining unit 28 obtains a current mail address on the basis of the change history table 26, and the response result transmitting unit 29 informs the processing terminal 10 having issued the update request of the current mail address. In other words, in the above embodiment, when former and current mail addresses are registered as a change history in the change history table 26, the current mail address is notified to all the processing terminals 10 having issued update requests. However, this invention is not limited to this example. The user who changes his/her mail address may designate a processing terminal 10 to which the user gives permission to disclose his/her new mail address.

In such case, as shown in FIG. 20, it is possible to make a change history table 26b for specifying a mail address (or an IP address) of a processing terminal 10 to which permission to disclose a current mail address is given. The current address information obtaining unit 28 may compare a mail address of a processing terminal 10 having issued an update request with a mail address (here, "ikeda@ddd.co.jp" or the like) that is specified as one given permission to disclose the current mail address in the change history table 26b, obtain the current mail address when it is found in the change history table 26b that the mail address of the processing terminal 10 is given permission to disclose the current mail address, and informs the processing terminal 10 of the current mail address. In which case, the new mail address is not informed to a processing terminal 10 that is not given the permission.

The user who changes his/her mail address can designate a processing terminal 10 to which the user does not give permission to disclose the new mail address.

As shown in FIG. 21, a processing terminal 10 (here, a processing terminal 10 whose mail address is "okada@eee.ne.jp") to which the user does not give permission to disclose his/her new mail address may be specified, the current mail address may be informed to only the other processing terminals 10 without informing to the processing terminal 10 not given the permission to disclose the new mail address. Whereby, the user who changes his/her mail address can designate a processing terminal to which the current mail address is not informed.

The functions of the update request issuing unit 10b, the updating unit 10c, the transmitting unit 21, the dividing unit 22, the grouped-updated request transmitting unit 23, the notifying unit 24, the determining unit 27, the current address obtaining unit 28 and the response result transmitting unit 29 may be accomplished by executing a predetermined application program (address information managing program) by a computer (including CPUs, information processing devices, various kinds of terminals).

This program is provided in a form in which the program is recorded on a computer readable recording medium such as a flexible disk, a CD (CD-ROM, CD-R, CD-RW, etc.), DVD (DVD-ROM, DVD-RAM, DVD-R, DVD-RW, DVD+R, DVD+RW, etc.) or the like. In this case, the computer reads the operation control program from the recording medium, transfers the program to the internal storage or an external storage to store it, and use the same. The program may be recorded on a storage (recording medium) such as a magnetic disk, an optical disk, a magneto-optical disk or the like, and provided to the computer from the storage over a communication line.

Here, the computer is a concept including hardware and an OS (Operating System), operating under control of the OS. When the OS is unnecessary and the application program solely operates the hardware, the hardware itself corresponds to the computer. The hardware has at least a microprocessor such as a CPU or the like, and a means for reading the computer program recorded on the recording medium.

The application program as being the above operation control program includes program codes for making the computer realize the functions of the update request issuing unit 10b, the updating unit 10c, the transmitting unit 21, the dividing unit 22, the grouped-updated request transmitting unit 23, the notifying unit 24, the determining unit 27, the current address information obtaining unit 28 and the response result transmitting unit 29. A part of these functions may be realized by, not the application program, but the OS.

As the recording medium in the embodiment of this invention, there may be used various kinds of computer readable media such as an IC card, a ROM cartridge, a magnetic tape, a punched card, an internal storage (memory such as RAM, ROM or the like) of a computer, an external storage, a printed matter on which codes such as bar codes or the like are printed and so forth, other than a flexible disk, a CD, a DVD, a magnetic disk, an optical disk and a magneto-optical disk mentioned above.

What is claimed is:

1. An address information managing system comprising:
   a processing apparatus comprising:
   an update request issuing unit issuing an update request, containing address information to be updated, in order to update an address book of said processing apparatus retaining the address information about other processing apparatuses; and an updating unit updating said address book on the basis of a response result to the update request issued from said update request issuing unit;

a valid address list showing valid address information;

a determining unit, when receiving the update request issued from said update request issuing unit of said processing apparatus, searching for the address information contained in the update request in said valid address list, determining that the address information is valid when the address information is found in said valid address list, while determining that the address information is invalid when the address information is not found in said valid address list;

a response result transmitting unit transmitting a result of determination made by said determining unit to said processing apparatus as the response result to the update request, wherein said address information managing system further comprises:

a change history table showing a relationship between current address information retained in said valid address list and former address information that had been used until the address information was changed to the current address information; and a current address information obtaining unit searching for the address information contained in the update request in said change history table when said determining unit determines on the basis of the valid address list that the address information is invalid, and obtaining current address information retained in said valid address list corresponding to the address information contained in the update request from said change history table when the address information is found in the search, wherein said response result transmitting unit transmits the current address information to said processing apparatus as the response result when said current address information obtaining unit obtains the current address information, wherein, when said updating unit of said processing apparatus receives the current address information, as the response result, obtained by said current address obtaining unit from said response result transmitting unit, said updating unit overwrites the address information to be updated with the current address information in said address book.

2. The address information managing system according to claim 1, wherein said update request issuing unit of said processing apparatus periodically issues the update request.

3. The address information managing system according to claim 1 further comprising:

a management apparatus managing address information on other processing apparatuses, said management apparatus having said determining unit; and a transmitting unit, when receiving the update request from said update request issuing unit of said processing apparatus, transmitting the update request to said management apparatus managing the address information on the basis of the address information contained in the update request.

4. The address information managing system according to claim 3, wherein said transmitting unit comprises:

a dividing unit, when the update request contains plural kinds of the address information, dividing the plural kinds of the address information into groups for respective management servers managing the address information; and a grouped-address information transmitting unit transmitting the groups divided by said dividing unit to the respective management servers.

5. The address information managing system according to claim 3, wherein said management apparatus has said response result transmitting unit; and said address information managing system further comprises a notifying unit notifying said processing apparatus of the response result transmitted from said response result transmitting unit of said management server.

6. The address information managing system according to claim 5, wherein, when said notifying unit receives a plurality of response results transmitted from said response result transmitting units of a plurality of said management servers, said notifying unit collects the plural response results and notifies said processing apparatus of the collected response results.

7. A management apparatus in a communication network in which a plurality of processing apparatuses are communicably connected to one another over a network, and one of said plural processing apparatuses, which is acting as an inquiring-side processing apparatus, comprises (i) an update request issuing unit issuing an update request, containing address information to be updated, in order to update an address book thereof retaining address information about other processing apparatuses, and (ii) an updating unit updating said address book on the basis of a response result to the update request issued from said update request issuing unit, said management apparatus managing address information on said other processing apparatuses comprising:

a valid address list showing valid address information;

a determining unit, when receiving the update request issued from said update request issuing unit of said inquiring-side processing apparatus, searching the address information contained in the update request in said valid address list, determining that the address information is valid when the address information is found in said valid address list, while determining that the address information is invalid when the address information is not found in said address list;

a response result transmitting unit transmitting a result of determination made by said determining unit to said inquiring-side processing apparatus as the response result to the update request, wherein said management apparatus further comprises:

a change history table showing a relationship between current address information retained in said valid address list and former address information that had been used until the address information was changed to the current address information; and a current address information obtaining unit searching for the address information in said change history table when said determining unit determines on the basis of the valid address list that the address information contained in the update request is invalid, and obtaining current address information retained in said valid address list corresponding to the address information contained in the update request from said change history table when the address information is found in the search, wherein said response result transmitting unit transmits the current address information to said inquiring-side processing apparatus as the response result when said current address information obtaining unit obtains the current address information, wherein, when said updating unit of said processing apparatus receives the current address information, as the response result, obtained by said current address obtaining unit from said response result transmitting unit, said updating unit overwrites the address information to be updated with the current address information in said address book.

8. An address book updating method in a communication system comprising a plurality of processing apparatuses communicably connected to one another, and management servers managing address information on said processing apparatuses, said address book updating method updating an address book of one of said plural processing apparatuses, which is acting as an inquiring-side processing apparatus, containing address information on other processing apparatuses, the address book updated method comprising:

issuing an update request, containing address information to be updated from said inquiring-side processing apparatus, in order to update said address book retaining address information about said other processing apparatuses;

first searching the address information contained in the update request in a valid address list showing valid address information when an answering-side management server of said management servers managing the address information receives the issued update request;

determining that the address information is valid when the address information is found in said valid address list, while determining that the address information is invalid when the address information is not found in said address list;

transmitting a result of the determination, as a response result to the update request, from said answering-side management server to said inquiring-side processing apparatus; and updating said address book on the basis of the response result when said inquiring-side processing apparatus receives the transmitted response result, wherein said address book updating method further comprises:

second searching for the address information in a change history table showing a relationship between current address information retained in said valid address list and former address information that had been used until the address information was changed to the current address information when said determining determines on the basis of the valid address list that the address information contained in the update request is invalid; and obtaining current address information retained in said valid address list corresponding to the address information contained in the update request from said change history table when the address information is found in the second search, wherein said transmitting transmits the current address information to said inquiring-side processing apparatus as the response result when the current address information is obtained in said obtaining, wherein, when said updating receives the current address information, as the response result transmitted by said transmitting, said updating overwrites the address information to be updated with the current address information in said address book.

* * * * *